US012684294B2

(12) United States Patent
Choi et al.

(10) Patent No.: US 12,684,294 B2
(45) Date of Patent: Jul. 14, 2026

(54) APPARATUS

(71) Applicant: LG Display Co., Ltd., Seoul (KR)

(72) Inventors: YeongRak Choi, Paju-si (KR); Kwangho Kim, Paju-si (KR); Seonwook Lee, Paju-si (KR); Daewon Kim, Paju-si (KR); Seungwoo Baek, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 261 days.

(21) Appl. No.: 18/389,035

(22) Filed: Nov. 13, 2023

(65) Prior Publication Data

US 2024/0259732 A1 Aug. 1, 2024

(30) Foreign Application Priority Data

Jan. 30, 2023 (KR) ........................ 10-2023-0012055

(51) Int. Cl.
*H04R 17/00* (2006.01)
*H04R 7/06* (2006.01)

(52) U.S. Cl.
CPC ............... *H04R 7/06* (2013.01); *H04R 17/00* (2013.01)

(58) Field of Classification Search
CPC . H04R 7/04; H04R 7/045; H04R 7/06; H04R 7/08; H04R 7/10; H04R 2440/00; H04R 2440/01; H04R 2440/05; H04R 2440/07; H10N 30/50
See application file for complete search history.

(56) References Cited

U.S. PATENT DOCUMENTS

| | | | | |
|---|---|---|---|---|
| 1,744,561 | A * | 1/1930 | Marckworth | B27D 1/00 156/308.6 |
| 4,029,171 | A * | 6/1977 | Manger | B32B 27/06 181/170 |
| 4,439,640 | A * | 3/1984 | Takaya | H04R 17/00 310/321 |
| 4,461,930 | A | 7/1984 | Melillo et al. | |
| 4,494,032 | A * | 1/1985 | Martin | H04R 17/00 310/322 |
| 6,278,790 | B1 * | 8/2001 | Davis | H04R 7/04 381/431 |

(Continued)

FOREIGN PATENT DOCUMENTS

| | | | | |
|---|---|---|---|---|
| CN | 114143672 A | * | 3/2022 | H04R 15/00 |
| CN | 115314810 A | | 11/2022 | |

(Continued)

OTHER PUBLICATIONS

Cao et al., "A Review of Current Development of Graphene Mechanics", Crystals. Sep. 6, 2018; vol. 8, No. 9, p. 357. [retrieved on Sep. 25, 2025]. Retrieved from the Internet:<URL:https://www.mdpi.com/2073-4352/8/9/357> (Year: 2018).*

*Primary Examiner* — Ryan Robinson
(74) *Attorney, Agent, or Firm* — Birch, Stewart, Kolasch & Birch, LLP

(57) ABSTRACT

An apparatus includes a vibration member and a vibration apparatus configured to vibrate the vibration member. The vibration member includes a plurality of plates overlapping one another and including different materials. The apparatus can enhance a sound characteristic and/or a sound pressure level characteristic of a low-pitched sound band of a sound generated by the apparatus.

18 Claims, 9 Drawing Sheets

(56) References Cited

U.S. PATENT DOCUMENTS

| | | | | |
|---|---|---|---|---|
| 6,332,029 | B1 * | 12/2001 | Azima | H04R 1/021 381/337 |
| 6,985,596 | B2 * | 1/2006 | Bank | H04R 9/025 381/152 |
| 7,596,235 | B2 * | 9/2009 | Michiels | H04R 17/00 381/431 |
| 7,726,441 | B2 * | 6/2010 | Uryu | H04R 7/10 181/170 |
| 8,873,776 | B2 * | 10/2014 | Kim | H04R 17/005 381/190 |
| 9,070,355 | B2 * | 6/2015 | Terazono | G10K 9/10 |
| 9,571,615 | B2 * | 2/2017 | Horii | H10N 30/02 |
| 9,693,143 | B2 * | 6/2017 | Böhm | H04R 31/003 |
| 9,796,160 | B2 * | 10/2017 | Müssig | B32B 27/285 |
| 9,827,749 | B2 * | 11/2017 | Egger | C09D 171/00 |
| 9,955,266 | B2 * | 4/2018 | Liu | H04R 7/125 |
| 10,911,851 | B2 * | 2/2021 | Noh | H04R 1/24 |
| 11,516,425 | B2 * | 11/2022 | Maeshiba | H04R 1/2811 |
| 11,800,287 | B2 * | 10/2023 | Wang | B32B 27/36 |
| 11,910,159 | B2 * | 2/2024 | Miyoshi | H10N 30/875 |
| 2003/0081799 | A1 | 5/2003 | Klasco et al. | |
| 2003/0099371 | A1 | 5/2003 | Ogura et al. | |
| 2003/0124271 | A1 * | 7/2003 | Michael | B60R 13/0243 428/31 |
| 2003/0223613 | A1 * | 12/2003 | Hachiya | H04R 7/125 381/423 |
| 2012/0148073 | A1 | 6/2012 | Kim et al. | |
| 2014/0210309 | A1 * | 7/2014 | Miyoshi | G10H 3/146 310/313 A |
| 2020/0059733 | A1 * | 2/2020 | Shin | H04R 17/00 |
| 2021/0366456 | A1 * | 11/2021 | Jeong | H04R 1/2826 |
| 2022/0158072 | A1 | 5/2022 | Yueh et al. | |
| 2023/0007374 | A1 * | 1/2023 | Zhou | H04R 9/025 |

FOREIGN PATENT DOCUMENTS

| | | | | |
|---|---|---|---|---|
| DE | 10246792 | A1 * | 5/2004 | H04R 7/06 |
| DE | 102015103339 | A1 * | 9/2016 | H04R 7/045 |
| JP | 2010-157926 | A | 7/2010 | |
| JP | 2022-173152 | A | 11/2022 | |
| TW | 202304022 | A | 1/2023 | |
| WO | WO 2014/024756 | A1 | 2/2014 | |
| WO | WO 2019/172076 | A1 | 9/2019 | |
| WO | WO 2022/038877 | A1 | 2/2022 | |

* cited by examiner

APPARATUS

CROSS-REFERENCE TO RELATED APPLICATIONS

This application claims priority, under 35 U.S.C. § 119, to Korean Patent Application No. 10-2023-0012055 filed in the Republic of Korea on Jan. 30, 2023, the entirety of which is hereby expressly incorporated by reference into the present application.

BACKGROUND

Technical Field

The present disclosure relates to an apparatus, and more particularly, to an apparatus for outputting a sound.

Discussion of the Related Art

An apparatus can include a separate speaker or a sound apparatus for providing sounds. The sound apparatus includes a vibration system which converts an input electrical signal into a physical vibration. As a sound apparatus, piezoelectric speakers including a piezoelectric device are known as being lightweight and providing low power consumption and thus, are used for various purposes.

However, in a piezoelectric device used in such piezoelectric speakers, a lowest resonance frequency generally increases due to high stiffness within the piezoelectric speakers, which results in a sound pressure level (i.e., a volume) of a low-pitched sound band being insufficient.

Therefore, the piezoelectric speakers can have a technical limitation where a sound pressure level of the low-pitched sound band may not be sufficient within the piezoelectric speakers. Further, due to this limitation, apparatuses including such a piezoelectric speaker can have the same or similar technical issue where the sound pressure level characteristic of the low-pitched sound band is not sufficient.

SUMMARY OF THE DISCLOSURE

Therefore, the inventors of the present disclosure have recognized these limitations described above and other limitations associated with the related art, and have performed various research and experiments for enhancing a sound characteristic and/or a sound pressure level characteristic of an apparatus or a sound apparatus. Based on the various research and experiments, the inventors of the present disclosure have invented an improved apparatus for enhancing a sound characteristic and/or a sound pressure level characteristic of a low-pitched sound band of the apparatus.

One or more aspects of the present disclosure are directed to providing an apparatus which can enhance a sound characteristic and/or a sound pressure level characteristic of a low-pitched sound band.

One or more aspects of the present disclosure are directed to providing an apparatus in which a flatness characteristic of a sound pressure level is enhanced.

Additional features, advantages, and aspects of the present disclosure are set forth in part in the present disclosure and will also be apparent from the present disclosure or can be learned by practice of the inventive concepts provided herein. Other features, advantages, and aspects of the present disclosure can be realized and attained by the structure particularly pointed out in the present disclosure, or derivable therefrom, and claims hereof as well as the appended drawings.

To achieve these and other advantages and aspects of the present disclosure, as embodied and broadly described herein, in one or more aspects, an apparatus comprises a vibration member, and a vibration apparatus configured to vibrate the vibration member, the vibration member comprises a plurality of plates overlapping one another and including different materials.

An apparatus according to one or more embodiments of the present disclosure can realize an effect where a sound characteristic and/or a sound pressure level characteristic of a low-pitched sound band is enhanced.

An apparatus according to one or more embodiments of the present disclosure can realize an effect where a sound characteristic and/or a sound pressure level characteristic of a full-pitched sound band is enhanced.

An apparatus according to one or more embodiments of the present disclosure can realize an effect where a flatness characteristic of a sound pressure level is enhanced.

In an apparatus according to one or more embodiments of the present disclosure, a signal supply member can be connected with a vibration apparatus without a soldering process, and thus, a hazardous process can be reduced.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspects and embodiments of the disclosure and together with the description serve to explain principles of the disclosure.

Figure 1:
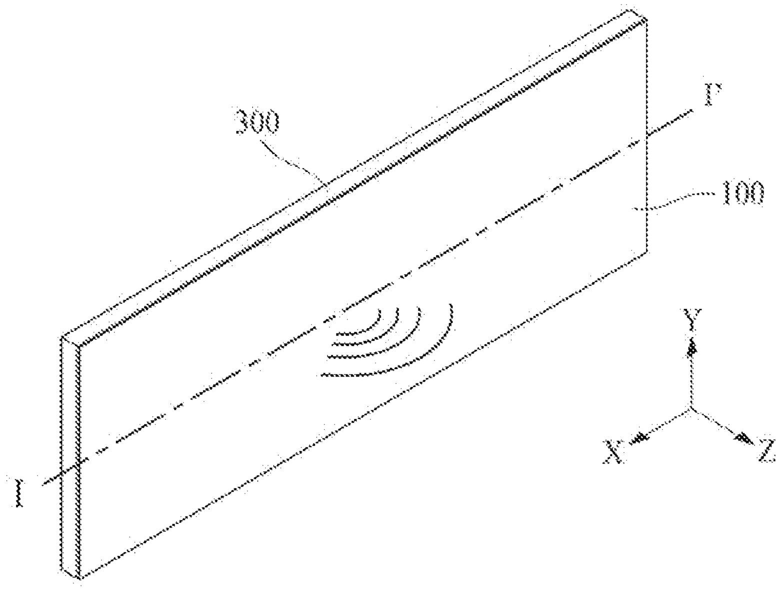
FIG. 1 is a perspective view illustrating an apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTIONS OF THE EMBODIMENTS

Reference is now made in detail to embodiments of the present disclosure, examples of which can be illustrated in the accompanying drawings. In the following description, when a detailed description of well-known functions, structures or configurations can unnecessarily obscure aspects of the present disclosure, a detailed description of such known functions or configurations can have been omitted for brevity. Further, repetitive descriptions can be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the example embodiments set forth herein. Rather, these example embodiments are examples and are provided so that this disclosure can be thorough and complete to assist those skilled in the art to understand the inventive concepts without limiting the protected scope of the present disclosure.

Shapes (e.g., sizes, lengths, widths, heights, thicknesses, locations, radii, diameters, and areas), dimensions, ratios, angles, numbers, and the like disclosed herein, including those illustrated in the drawings are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

Where the term "comprise," "have," "include," "contain," "constitute," "made of," "formed of," or the like is used with respect to one or more elements, one or more other elements can be added unless a term such as "only" or the like, is used. The terms used in the present disclosure are merely used in order to describe example embodiments, and are not intended to limit the scope of the present disclosure. The terms of a singular form can include plural forms unless the context clearly indicates otherwise.

The word "exemplary" is used to mean serving as an example or illustration, unless otherwise specified. Aspects are example aspects. "Embodiments," "examples," "aspects," and the like should not be construed as preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential can be included and thus one or more other events may occur therebetween, unless a more limiting term, such as "just," "immediate(ly)," or "direct(ly)," is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like can be used herein to describe various elements (e.g., layers, films, regions, components, sections, or the like), these elements should not be limited by these terms, for example, to any particular order, sequence, precedence, or number of elements. These terms are used only to distinguish one element from another. For example, a first element could be termed a second element, and, similarly, a second element could be termed a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms can mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); or some combination of A, B, and C (e.g., A and B; A and C; or B and C); and all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure can be partially or entirety coupled to or combined with each other, may be technically associated with each other, and can be operated, linked, or driven together in various ways. Embodiments of the present disclosure can be implemented or carried out independently of each other, or can be implemented or carried out together in a co-dependent or related relationship. In one or more aspects, the components of each apparatus according to various embodiments of the present disclosure can be operatively coupled and configured.

Unless otherwise defined, the terms (including technical and scientific terms) used herein have the same meaning as commonly understood by one of ordinary skill in the art to which example embodiments belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings can be different from an actual scale, dimension, size, and thickness. Thus, embodiments of the present disclosure are not limited to a scale, dimension, size, or thickness illustrated in the drawings.

Figure 2:
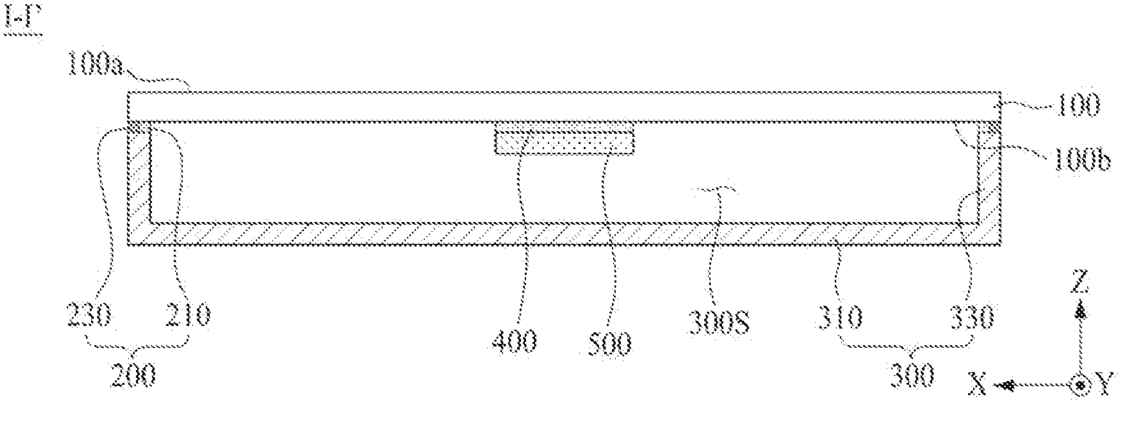
FIG. 2 is a cross-sectional view taken along line I-I' illustrated in FIG. 1 according to an embodiment of the present disclosure.

FIG. 1 is a perspective view illustrating an apparatus according to an embodiment of the present disclosure. FIG. 2 is a cross-sectional view taken along line I-I' illustrated in FIG. 1 according to an embodiment of the present disclosure.

With reference to FIGS. 1 and 2, an apparatus according to an embodiment of the present disclosure can be implemented as or realized as at least one of a sound apparatus, a sound output apparatus, a vibration apparatus, a vibration generating apparatus, a sound bar, a sound system, a sound apparatus for electronic apparatuses, a sound apparatus for displays, a sound apparatus for vehicular apparatuses (or transporting apparatuses), or a sound bar for vehicular apparatuses (or transporting apparatuses), or the like. These terms are not mutually exclusive and can intersect. For example, a sound apparatus according to an embodiment of the present disclosure can also be a sound output apparatus, a vibration apparatus, a vibration generating apparatus, a sound bar, and/or a sound system, and so on (and in all combinations and permutations of the terms). As another example, a vehicular apparatus (or transporting apparatus) can include one or more seats and one or more glass windows. For example, the vehicular apparatus (or transporting apparatus) can include a vehicle, a train, a ship, a mobile device, or an aircraft, but embodiments of the present disclosure are not limited thereto. Further, the apparatus according to an embodiment of the present disclosure can be implemented as or realized as an analog signage or a digital signage, or the like such as an advertising signboard, a poster, or a noticeboard, or the like. Other examples of the apparatus are possible.

The apparatus according to an embodiment of the present disclosure can include a vibration member 100 and a vibration apparatus 500.

The vibration member 100 can generate a vibration or can output a sound (or a sound wave), based on a displacement (or driving) of the vibration apparatus 500. The vibration member 100 can be a vibration object, a signage panel, a passive vibration plate, a front member, a vibration panel, a sound panel, a passive vibration panel, a sound output plate, a sound vibration plate, or the like, but embodiments of the present disclosure are not limited thereto. More generally, the vibration member 100 can be a member which is capable of vibrating when driven.

The vibration member 100 according to an embodiment of the present disclosure can include a polygonal shape including a rectangular shape or a square shape, but embodiments of the present disclosure are not limited thereto. The vibration member 100 can include a widthwise length parallel to a first direction X (e.g., X-direction shown in FIGS. 1 and 2) and a lengthwise length parallel to a second direction Y (e.g., Y-direction shown in FIGS. 1 and 2). For example, with respect to a same plane, the first direction X can be a first horizontal direction or a first horizontal length direction of the vibration member 100, and the second direction Y can be a second horizontal direction or a second horizontal length direction of the vibration member 100 which is orthogonal or substantially orthogonal to the first direction X. The vibration member 100 may also include a height in a third direction Z that is perpendicular to both the first direction X and the second direction Y. The third direction Z may be a vertical direction.

The vibration member 100 according to an embodiment of the present disclosure can include an entire structure having (e.g., substantially) a same thickness (e.g., uniform thickness), but embodiments of the present disclosure are not limited thereto. For example, the vibration member 100 can include a plate structure having (e.g., substantially) a same thickness throughout its structure (e.g., uniform thickness), but embodiments of the present disclosure are not limited thereto. For example, the vibration member 100 can include a nonplanar structure having a convex portion and/or a concave portion.

According to an embodiment of the present disclosure, the vibration member 100 can include a first surface 100*a* and a second surface 100*b*. In the vibration member 100, the first surface 100*a* can be a front surface, a forward surface, a top surface, or an upper surface. The second surface 100*b* can be a rear surface, a rearward surface, a backside, a back surface, a bottom surface, or a lower surface. The first and second surfaces 100*a* and 100*b* be opposite surfaces that face each other.

According to an embodiment of the present disclosure, the vibration member 100 can be implemented as or realized as a signage panel such as an analog signage, a digital signage, or the like such as an advertising signboard, a poster, a noticeboard, or the like. For example, when the vibration member 100 can be implemented as the signage panel, the analog signage can include signage content such as a sentence, a picture, and a sign, or the like. The signage content can be disposed at the vibration member 100 to be visible or visual. For example, the signage content can be attached on one or more of the first surface 100*a* and the second surface 100*b* of the vibration member 100. For example, the signage content can be directly attached on one or more of the first surface 100*a* and the second surface 100*b* of the vibration member 100. For example, the signage content can be printed on a medium such as paper or the like, and the medium with the signage content printed thereon can be directly attached on one or more of the first surface 100*a* and the second surface 100*b* of the vibration member 100. For example, when the signage content is attached on the second surface 100*b* of the vibration member 100, the vibration member 100 can be configured as a transparent material.

The vibration member 100 according to an embodiment of the present disclosure can include a plurality of plates overlapping one another. For example, the vibration member 100 can include a plurality of plates overlapping one another and configured in different materials to each other. For example, the vibration member 100 can include a plurality of plates, which are vertically stacked or formed. For example, the vibration member 100 can include a plurality of plates, which are vertically stacked or formed and configured in different materials to each other.

The vibration apparatus 500 (also referred to as the vibration device) can be configured to vibrate the vibration member 100. As used herein, the terms "vibration apparatus 500" and "vibration device 500" may be used interchangeably. The vibration apparatus 500 can be disposed or configured at the vibration member 100. The vibration apparatus 500 can be configured to vibrate (or displace or drive) based on a driving signal (or an electrical signal, which may convey an electrical voice signal, or a sound wave signal) applied thereto to vibrate (or displace or drive) the vibration member 100. For example, the vibration apparatus 500 can be one or more of an active vibration member, a vibration generator, a vibration structure, a vibrator, a vibration generating device, a sound generator, a sound device, a sound generating structure, or a sound generating device, but embodiments of the present disclosure are not limited thereto. As above, these terms are not mutually exclusive and may intersect.

The vibration apparatus 500 according to an embodiment of the present disclosure can include a piezoelectric material or an electroactive material, which has a piezoelectric characteristic. The vibration apparatus 500 can autonomously vibrate (or displace or drive) based on a vibration (or displacement or driving) of the piezoelectric material based on a driving signal applied to the piezoelectric material, or can vibrate (or displace or drive) the vibration member 100 or the like. For example, the vibration apparatus 500 can alternately repeat contraction and/or expansion based on a piezoelectric effect (or a piezoelectric characteristic) to vibrate (or displace or drive). For example, the vibration apparatus 500 can vibrate (or displace or drive) in the third direction Z (e.g., a vertical direction or a thickness direction) as contraction and/or expansion are alternately repeated by an inverse piezoelectric effect.

The vibration apparatus 500 according to an embodiment of the present disclosure can include a tetragonal shape which has a first length parallel to the first direction X and a second length parallel to the second direction Y. For example, the vibration apparatus 500 can include a square shape where the first length is the same as the second length, but embodiments of the present disclosure are not limited thereto.

The apparatus according to an embodiment of the present disclosure can further include a connection member 400.

The connection member 400 can be disposed or connected between the vibration apparatus 500 and the vibration member 100. The connection member 400 can be disposed between the vibration apparatus 500 and the vibration member 100, and can connect or couple the vibration apparatus 500 to the vibration member 100. For example, the vibration apparatus 500 can be connected or coupled to the vibration member 100 by the connection member 400. For example, the vibration apparatus 500 can be connected to or supported by the second surface 100*b* of the vibration member 100 by the connection member 400, but embodiments of the present disclosure are not limited thereto. For example, the connection member 400 can be a first connection member or a second adhesive member, but embodiments of the present disclosure are not limited thereto.

The connection member 400 according to an embodiment of the present disclosure can include an adhesive layer (or a tacky layer) which is suitable in providing an attaching force or adhesive force. For example, the connection member 400 can be configured as a material including an adhesive layer which is suitable in providing the attaching force or adhesive force, with respect to each of the vibration apparatus 500 and the second surface 100*b* of the vibration member 100. For example, the connection member 400 can include a foam pad, a double-sided tape, a double-sided foam pad, a double-sided foam tape, an adhesive, a double-sided adhesive, a double-sided adhesive tape, a double-sided adhesive foam pad, a tacky sheet, or the like, but embodiments of the present disclosure are not limited thereto. For example, when the connection member 400 includes the tacky sheet (or an adhesive layer), the connection member 400 can include only an adhesive layer or a tacky layer without a base member such as a plastic material or the like.

An adhesive layer of the connection member 400 according to an embodiment of the present disclosure can include a pressure sensitive adhesive (PSA), an optically cleared adhesive (OCA), an optically cleared resin (OCR), epoxy resin, acrylic resin, silicone resin, or urethane resin, or the like, but embodiments of the present disclosure are not limited thereto. For example, the adhesive layer of the connection member 400 can include an acrylic-based substance (or material) having a characteristic where an adhesive force is relatively better, and hardness is higher. Accordingly, the transfer efficiency of the vibration force (or displacement force) that is transferred from the vibration apparatus 500 to the vibration member 100 can be increased.

The apparatus according to an embodiment of the present disclosure can further include a supporting member 300.

The supporting member 300 can be configured or disposed at a rear surface or a surface of the vibration member 100. For instance, the supporting member 300 can be configured or disposed at the second surface 100*b* of the vibration member 100. The supporting member 300 can be configured to support a periphery portion of the second surface 100*b* of the vibration member 100. The supporting member 300 can be configured to support a periphery portion of a rear surface of the vibration member 100. The supporting member 300 can be configured to cover the vibration apparatus 500 and the second surface 100*b* of the vibration member 100. For example, the supporting member 300 can be configured to accommodate the connection member 400 and the vibration apparatus 500. For example, the supporting member 300 can be configured to cover the connection member 400 and the vibration apparatus 500.

The supporting member 300 according to an embodiment of the present disclosure can include an internal space 300S which surrounds the second surface 100*b* of the vibration member 100. For example, the supporting member 300 can include a box shape where one side (or one portion or an upper side or an upper portion) of the internal space 300S is opened. For example, the supporting member 300 can be a support member, a case, an outer case, a case member, a housing, a housing member, a cabinet, an enclosure, a sealing member, a sealing cap, a sealing box, a sound box, an accommodation member, a receiving member, or the like, but embodiments of the present disclosure are not limited thereto. For example, the internal space 300S of the supporting member 300 can be an accommodation space, a receiving space, a gap space, an air space, a vibration space, a sound space, a sound box, a sealing space, a resonance space, or the like, but embodiments of the present disclosure are not limited thereto.

The supporting member 300 according to an embodiment of the present disclosure can include one or more of a metal material and a nonmetal material (or a composite nonmetal material), but embodiments of the present disclosure are not limited thereto. For example, the supporting member 300 can include one or more materials of a metal material, plastic, and wood, but embodiments of the present disclosure are not limited thereto.

The supporting member 300 according to an embodiment of the present disclosure can include a first supporting part 310 and a second supporting part 330.

The first supporting part 310 can be disposed in parallel with the vibration member 100. The first supporting part 310 can be disposed to face the second surface 100*b* of the vibration member 100 and can span the same directions as the vibration member 100 (e.g., the first direction X and the second direction Y). The first supporting part 310 can be disposed to cover the second surface 100*b* of the vibration member 100. The first supporting part 310 can be spaced apart from the second surface 100*b* of the vibration member 100. For example, the first supporting part 310 can be spaced apart from the second surface 100*b* of the vibration member 100 with the internal space 300S therebetween. For example, the first supporting part 310 can be a bottom part, a bottom plate, a supporting plate, a housing plate, a housing bottom part, or the like, but embodiments of the present disclosure are not limited thereto.

The second supporting part 330 can be configured or disposed at a periphery portion of the vibration member 100. The second supporting part 330 can be connected to a periphery portion of the first supporting part 310. For example, the second supporting part 330 can include a structure bent from the periphery portion of the first supporting part 310. For example, the second supporting part 330 can be parallel to a third direction Z (e.g., Z-direction as shown in FIGS. 1 and 2), or can be inclined from the third direction Z. For example, the supporting member 300 can include two or more second supporting parts 330. For example, the second supporting part 330 can be a lateral part, a sidewall, a supporting sidewall, a housing lateral surface, a housing sidewall, or the like, but embodiments of the present disclosure are not limited thereto.

The second supporting part 330 can be integrated into the first supporting part 310. For example, the first supporting part 310 and the second supporting part 330 can be integrated (or configured) as one body (a single body), and thus, the internal space 300S surrounded by the second supporting part 330 can be provided over the first supporting part 310. Accordingly, the supporting member 300 can include a box shape where one side (or one portion or an upper side or an upper portion) is opened by the first supporting part 310 and the second supporting part 330. For example, the supporting member 300 can have a shape where the first and second supporting parts 310 and 330 define the walls of the supporting member 300 with one side being open (without any wall).

The supporting member 300 can be connected or coupled to the vibration member 100 by a coupling member 200. The supporting member 300 can be connected or coupled to the second surface 100*b* of the vibration member 100 by the coupling member 200. For example, the supporting member 300 can be connected or coupled to a periphery portion of the second surface 100*b* of the vibration member 100 by the coupling member 200. For example, the second supporting part 330 can be connected or coupled to the vibration member 100 by the coupling member 200. For example, the second supporting part 330 can be connected or coupled to the second surface 100*b* of the vibration member 100 by the coupling member 200. For example, the second supporting part 330 can be connected or coupled to a periphery portion of the second surface 100*b* of the vibration member 100 by the coupling member 200.

The coupling member 200 can be configured to minimize or prevent the transfer of a vibration of the vibration member 100 to the supporting member 300. The coupling member 200 can include a material characteristic suitable for blocking a vibration. For example, the coupling member 200 can include a material having elasticity. For example, the coupling member 200 can include a material having elasticity for vibration absorption (or impact absorption). The coupling member 200 according to an embodiment of the present disclosure can be configured as (or comprise) polyurethane materials and/or polyolefin materials, but embodiments of the present disclosure are not limited thereto. For example, the coupling member 200 can include one or more of an adhesive, a double-sided adhesive, a double-sided tape, a double-sided foam tape, a double-sided foam pad, and a double-sided cushion tape, but embodiments of the present disclosure are not limited thereto.

Further, the coupling member 200 according to an embodiment of the present disclosure can prevent a physical contact (or friction) between the vibration member 100 and the second supporting part 330 of the supporting member 300, and thus, can prevent the occurrence of noise (or a noise sound) which can be caused by the physical contact (or friction) between the vibration member 100 and the supporting member 300. For example, the coupling member 200 can be a buffer member, an elastic member, a damping member, a vibration absorption member, a vibration prevention member, or a vibration blocking member, but embodiments of the present disclosure are not limited thereto.

Further, the coupling member 200 according to another embodiment of the present disclosure can be configured to minimize or prevent the transfer of a vibration of the vibration member 100 to the supporting member 300 and to decrease the reflection of an incident sound wave which can be generated based on a vibration of the vibration member 100.

The coupling member 200 according to another embodiment of the present disclosure can include a first coupling member 210 and a second coupling member 230.

The first coupling member 210 can be disposed at a region between the vibration member 100 and the supporting member 300. The first coupling member 210 can be disposed at a region between the vibration member 100 and the second supporting part 330 of the supporting member 300. The first coupling member 210 can be disposed or coupled between a rear periphery portion of the vibration member 100 and a second supporting part 330. For example, the first coupling member 210 can be disposed inward (or towards an inner portion of the apparatus) from the second coupling member 230. The first coupling member 210 can be configured to have a hardness which is smaller than that of the second coupling member 230, for example, a modulus (of elasticity) or a Young's modulus (or elastic moduli). For example, the first coupling member 210 can include a double-sided polyurethane tape, a double-sided polyurethane foam tape, a double-sided sponge tape, or the like, but embodiments of the present disclosure are not limited thereto.

The second coupling member 230 can be disposed at a region between the vibration member 100 and the supporting member 300. For example, the second coupling member 230 can be disposed at a region between the vibration member 100 and the supporting member 300 to surround the first coupling member 210. The second coupling member 230 can be disposed or coupled between the rear periphery portion of the vibration member 100 and the second supporting part 330 of the supporting member 300. For example, the second coupling member 230 can be disposed or coupled between the rear periphery portion of the vibration member 100 and the second supporting part 330 of the supporting member 300 to surround the first coupling member 210. For example, the second coupling member 230 can be disposed outward (or towards an outer portion of the apparatus) from the first coupling member 210. The second coupling member 230 can be configured to have a hardness which is greater than that of the first coupling member 210, for example, a modulus (of elasticity) or a Young's modulus (or elastic moduli). For example, the second coupling member 230 can include a double-sided polyolefin tape, a double-sided polyolefin foam tape, a double-sided acrylic tape, a double-sided acrylic foam tape, or the like, but embodiments of the present disclosure are not limited thereto.

The coupling member 200 according to another embodiment of the present disclosure can absorb an incident sound wave which can be generated based on a vibration of the vibration member 100. For example, the first coupling member 210 which is relatively soft and is disposed inward from the second coupling member 230 which is relatively stiff (or harder) can absorb an incident sound wave which can be generated based on a vibration of the vibration member 100. Thus, a sound (or a wave) generated by being reflected from the coupling member 200 can be minimized or dampened. Accordingly, flatness of a sound pressure level generated based on a vibration of the vibration member 100 can be reduced. For example, the flatness of the sound pressure level can be a level of a deviation between a highest sound pressure level and a lowest sound pressure level within a pitched sound band generated based on a vibration of the vibration member 100.

In the coupling member 200 according to another embodiment of the present disclosure, the second coupling member 230 which is relatively stiff can be disposed inward (or towards an inner portion of the apparatus) from the first coupling member 210 which is relatively soft (or softer than the second coupling member 230). Accordingly, a sound pressure level in a specific-pitched sound band of a sound can be reduced. For example, a sound pressure level in a sound band of 2 kHz to 5 kHz and 7 kHz to 12 kHz can be reduced due to a reflected sound (or a reflected wave or a standing wave) generated by being reflected from the second coupling member 230 which is relatively stiff. Therefore, when a reduction in a sound pressure level in a sound band of 2 kHz to 5 kHz and 7 kHz to 12 kHz is needed based on a shape and a size of the vibration member 100, the second coupling member 230 which is relatively stiff can be disposed inward from the first coupling member 210 which is relatively soft. As such, the flatness of the sound pressure level can be improved based on a reduction in a sound pressure level in a sound band of 2 kHz to 5 kHz and 7 kHz to 12 kHz generated by the second coupling member 230.

The apparatus according to an embodiment of the present disclosure can generate (or output) a sound according to a vibration of the vibration member 100 based on a vibration of the vibration apparatus 500. The apparatus according to an embodiment of the present disclosure can generate (or output) a sound based on a vibration of the vibration member 100. Here, the vibration member 100 may include a plurality of plates configured in different materials to each other. As a result, a sound characteristic and/or a sound pressure level characteristic of the low-pitched sound band (or low-pitched frequency) can be enhanced.

Figure 3:
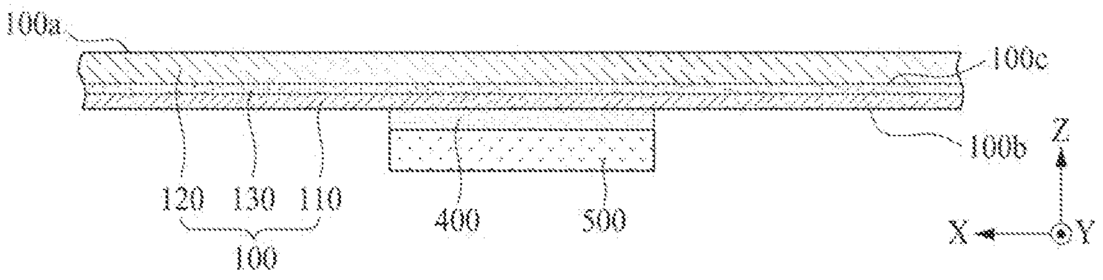
FIG. 3 illustrates a vibration member according to an embodiment of the present disclosure.

FIG. 3 illustrates a vibration member according to an embodiment of the present disclosure. Particularly, FIG. 3 is a cross-sectional view illustrating a vibration apparatus and a portion of the vibration member illustrated in FIG. 2 according to an embodiment of the present disclosure.

With reference to FIGS. 2 and 3, a vibration member 100 according to an embodiment (or a first embodiment) of the present disclosure can include a first plate 110 and a second plate 120, which are vertically stacked or formed. For example, the first plate 110 can configure or form the second surface **100*b* of the vibration member 100, and the second plate 120 can configure or form the first surface 100*a* of the vibration member 100. One of the first plate 110 and the second plate may be connected to the vibration apparatus 500**.

The first plate 110 and the second plate 120 can be configured in different materials to each other. The first plate 110 and the second plate 120 can be configured to have different stiffnesses to each other. For example, the first plate 110 and the second plate 120 can have different moduli (of elasticity) or Young's modulus (or elastic moduli) to each other. The first plate 110 and the second plate 120 can have different thicknesses to each other. For example, the first plate 110 can have a thickness which is thinner than that of the second plate 120, but embodiments of the present disclosure are not limited thereto.

The first plate 110 can be configured to vibrate based on a vibration of a vibration apparatus 500. The first plate 110 can be connected or coupled to the vibration apparatus 500 by a connection member 400. The connection member 400 can be disposed or connected between the vibration apparatus 500 and the first plate 110 of the vibration member 100. For example, the vibration apparatus 500 can be connected or coupled to a second surface 100*b* of the first plate 110 of the vibration member 100 by the connection member 400. The first plate 110 can contact the connection member 400.

The first plate 110 can have relatively high stiffness or a relatively high modulus. For example, the first plate 110 can be configured in a hard material. For example, the first plate 110 can be a hard plate, a first vibration member, a first vibration plate, a first plate member, or a first vibration plate member, but embodiments of the present disclosure are not limited thereto.

The first plate 110 according to an embodiment of the present disclosure can be configured in a material having a modulus which differs from that of the second plate 120. For example, the first plate 110 can be configured in a material having a modulus which is higher than that of the second plate 120. For example, the first plate 110 can be configured in a material having a modulus of 50 Gpa (gigapascal) or more. For example, the first plate 110 can be configured in a metal material or plastic material, but embodiments of the present disclosure are not limited thereto.

The first plate 110 according to an embodiment of the present disclosure can include one or more materials (or substance) of a metal material, fiber reinforced plastic, carbon, and glass, but embodiments of the present disclosure are not limited thereto. For example, the metal material of the first plate 110 can include one or more materials of stainless steel, aluminum (Al), an Al alloy, a magnesium (Mg), a Mg alloy, copper (Cu), a copper (Cu) alloy, and a magnesium-lithium (Mg—Li) alloy, but embodiments of the present disclosure are not limited thereto. For example, the fiber reinforced plastic can be carbon fiber reinforced plastic (CFRP), but embodiments of the present disclosure are not limited thereto.

The second plate 120 can be disposed on (or over) the first plate 110. For example, the first plate 110 can be disposed closer (e.g., more adjacent) to the vibration apparatus 500 than the second plate 120. For example, the second plate 120 can configure or form the first surface 100*a* of the vibration member 100, and thus, can be a front plate, an upper plate, or a sound output plate, but embodiments of the present disclosure are not limited thereto.

The second plate 120 can be configured to vibrate based on a vibration of the first plate 110. The second plate 120 can be configured to balance or adjust a sound pressure level characteristic of a sound generated based on a vibration of the first plate 110. For example, because the second plate 120 has a lower modulus than the first plate 110, the second plate 120 can be configured to decrease a dip portion and a peak portion of a sound caused by a vibration generated in the vibration apparatus 500 and/or the first plate 110.

The second plate 120 can be configured in a soft material having a ductile (e.g., soft and/or elastic) characteristic. For example, the second plate 120 can have relatively low stiffness or a relatively low modulus. For example, the second plate 120 can decrease a dip portion and a peak portion of a sound caused by a vibration generated in the vibration apparatus 500 and/or the first plate 110, based on a ductile (e.g., soft and/or elastic) characteristic. The second plate 120 can decrease a dip phenomenon and a peak phenomenon in a sound of a low-pitched sound band which can be caused by a vibration of the vibration member 100, based on a ductile (e.g., soft and/or elastic) characteristic. For example, the second plate 120 can be a soft plate, a second vibration member, a second vibration plate, a second plate member, or a second vibration plate member, but embodiments of the present disclosure are not limited thereto.

The second plate 120 according to an embodiment of the present disclosure can be configured in a material having a modulus of 10 Gpa (gigapascal) or less. The second plate 120 can be configured in or comprise a plastic material such as plastic or styrene material, but embodiments of the present disclosure are not limited thereto. For example, a plastic material of the second plate 120 can include polycarbonate, polyethylene terephthalate, polyarylate, polyethylene naphthalate, polysulfone, polyethersulfone, cyclo-olefin copolymer, or the like, but embodiments of the present disclosure are not limited thereto. For example, the styrene material can be an ABS material. The ABS material can be acrylonitrile, butadiene, and styrene.

The second plate 120 can be configured in a porous material. For example, the second plate 120 can include a porous plastic material or a micro cellular plastic material. For example, the second plate 120 can be configured as a polyethylene terephthalate (PET) material or a polycarbonate (PC) material. For example, the second plate 120 can be configured as a Micro Cellular polyethylene terephthalate (MCPET) material. The second plate 120 configured in the MCPET can have capability to reproduce a high original sound by having a low density and an excellent elastic force, thereby enhancing the quality of a sound.

The second plate 120 according to another embodiment of the present disclosure can have the relatively large amount of displacement (e.g., large amounts of amplitude, which may be caused by bending force due to the vibration apparatus 500) with respect to a vibration (or displacement) of the vibration apparatus 500, based on the porosity, and thus, a sound characteristic and/or a sound pressure level characteristic of a low-pitched sound band can be improved. Therefore, the vibration member 100 can include the second plate 120 configured in a porous material, and thus, a dip phenomenon and a peak phenomenon in a sound of the low-pitched sound band caused by a vibration can be decreased and a sound pressure level of the low-pitched sound band can be increased. For example, in a sound of 1 kHz or less generated by a vibration of the vibration member 100, the number of dip portions and peak portions of a sound pressure level can be decreased.

The vibration member 100 according to an embodiment of the present disclosure can further include an adhesive member 130 between the first plate 110 and the second plate 120.

The adhesive member 130 can be configured between the first plate 110 and the second plate 120. For example, the adhesive member 130 can be provided between a front surface of the first plate 110 and a rear surface 100*c* of the second plate 120. For example, the adhesive member 130 can be configured between an entire front surface of the first plate 110 and an entire rear surface 100*c* of the second plate 120. Accordingly, the first plate 110 and the second plate 120 can be coupled to each other or stacked (or formed) by the adhesive member 130.

The adhesive member 130 according to an embodiment of the present disclosure can include a double-sided tape, a double-sided foam tape, a double-sided adhesive, an adhesive, or the like, but embodiments of the present disclosure are not limited thereto. For example, an adhesive layer of the adhesive member 130 can include a pressure sensitive adhesive (PSA), an optically cleared adhesive (OCA), or an optically cleared resin (OCR), epoxy resin, acrylic resin, silicone resin, urethane resin, or the like, but embodiments of the present disclosure are not limited thereto.

The vibration apparatus 500 can vibrate the first plate 110 to vibrate the vibration member 100. For example, the vibration apparatus 500 can vibrate the first plate 110, and thus, can vibrate the first plate 110 (directly) and the second plate 120 (via the first plate 110). Accordingly, the vibration member 100 can generate (or output) a sound, based on vibrations of the first plate 110 and the second plate 120.

According to an embodiment of the present disclosure, a vibration of the vibration apparatus 500 can be transferred to the second plate 120 through the first plate 110, and thus, the first plate 110 can transfer a vibration of the vibration apparatus 500 to the second plate 120. Because the first plate 110 is configured in or formed by a material having relatively high stiffness, the transfer efficiency of a vibration transferred to the second plate 120 through the first plate 110 from the vibration apparatus 500 can increase and the vibration of the vibration apparatus 500 can be transferred to the second plate 120 without loss of the vibration. Accordingly, a vibration width (e.g., amplitude of vibration, or a displacement width) of the second plate 120 or the vibration member 100 can increase, and thus, a sound characteristic and/or a sound pressure level characteristic of the low-pitched sound band generated based on a vibration of the vibration member 100 can be enhanced because higher amplitudes and volumes are available at lower pitches.

The apparatus according to an embodiment of the present disclosure can generate (or output) a sound from a vibration of the vibration member 100 based on a vibration of the vibration apparatus 500. The apparatus according to an embodiment of the present disclosure can generate (or output) a sound according to a vibration of the vibration member 100 including the first and second plates 110 and 120 configured with different materials from each other, and thus, a sound characteristic and/or a sound pressure level characteristic can be enhanced and a vibration width (e.g., amplitude of vibration, or a displacement width) of the vibration member 100 can increase based on a ductile (e.g. soft and/or elastic) characteristic of the second plate 120, thereby enhancing a sound characteristic and/or a sound pressure level characteristic of the low-pitched sound band.

Figure 4:
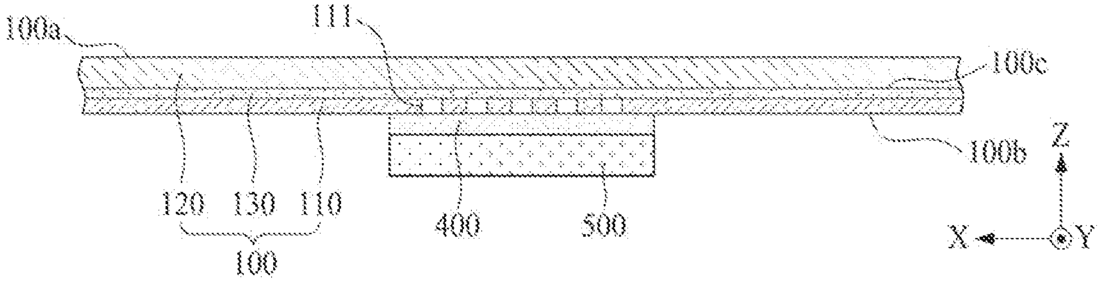
FIG. 4 illustrates a vibration member according to another embodiment of the present disclosure.

FIG. 4 illustrates a vibration member according to another embodiment of the present disclosure. Particularly, FIG. 4 is a cross-sectional view illustrating a vibration apparatus and a portion of the vibration member illustrated in FIG. 2 according to another embodiment of the present disclosure. Here, FIG. 4 illustrates an embodiment implemented by modifying the first plate of the apparatus described above with reference to FIGS. 1 to 3. In the following description, therefore, the other elements except the first plate and relevant elements are referred to like by reference numerals, and repeated descriptions thereof are omitted or may be briefly discussed.

With reference to FIGS. 2 and 4, a first plate 110 or a vibration member 100 according to another embodiment (or a second embodiment) of the present disclosure can include one or more holes 111.

The one or more holes 111 can be disposed or configured between the vibration apparatus 500 and the second plate 120. For example, the one or more holes 111 can be disposed or configured between the second plate 120 and the connection member 400. For example, the one or more holes 111 can be disposed or configured between the adhesive member 130 in the vibration member 100 and the second plate 120.

The one or more holes 111 can be configured at (e.g., formed or provided in) the first plate 110 between the vibration apparatus 500 and the second plate 120. For example, one or more holes 111 can overlap the vibration apparatus 500 in the vertical direction. For example, one or more holes 111 can be configured at (e.g., formed or provided in) a portion of the first plate 110 overlapping the vibration apparatus 500. The first plate 110 can comprise one or more holes 111 passing through the first plate 110.

The one or more holes 111 can be configured as one or more air gaps (or one or more air pockets) between the vibration apparatus 500 and the second plate 120. The one or more holes 111 can be a space through which a sound wave generated based on a vibration of the vibration apparatus 500 is propagated (or transferred) to the second plate 120. Accordingly, a vibration width (e.g., an amplitude of vibration or a displacement width) of the vibration member 100 based on a vibration of the vibration apparatus 500 can increase, and thus, a sound characteristic and/or a sound pressure level characteristic of a sound generated based on a vibration of the vibration member 100 can be enhanced.

The one or more holes 111 can be a space where air bubbles occurring when attaching the first plate 110 on (or to or at) the second plate 120 by the adhesive member 130 are collected. Accordingly, a process of attaching the first plate 110 on (or to or at) the second plate 120 can be easily performed, and thus, productivity of the apparatus can be enhanced.

Figure 5:
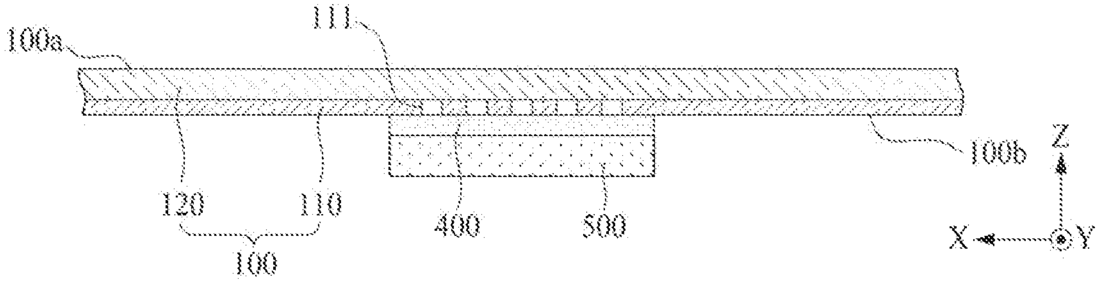
FIG. 5 illustrates a vibration member according to another embodiment of the present disclosure.

FIG. 5 illustrates a vibration member according to another embodiment of the present disclosure. Particularly, FIG. 5 is a cross-sectional view illustrating a vibration apparatus and a portion of the vibration member illustrated in FIG. 2 according to another embodiment of the present disclosure. Here, FIG. 5 illustrates an embodiment implemented by modifying a connection structure between the first and second plates of the apparatus described above with reference to FIGS. 1 to 4. In the following description, the other elements except a connection structure between first and second plates and relevant elements are referred to by like reference numerals, and repeated descriptions thereof are omitted or may be briefly discussed.

With reference to FIGS. 2 and 5, a vibration member 100 according to another embodiment (or a third embodiment) of the present disclosure can include a first plate 110 and a second plate 120, which are configured (or integrated) as one body.

The first plate 110 and the second plate 120 can be coupled to each other or configured (or integrated) as one body without a separate adhesive member or adhesive such as the member 130 shown in FIGS. 3 and 4. For example, the first plate 110 and the second plate 120 can be directly connected or coupled to each other without an intermediary medium such as the adhesive member 130 described above with reference to FIG. 3. For example, the first plate 110 and the second plate 120 can be configured as one plate which is integrated with each other or bonded to each other based on a deposition (or fusion bonding) process or another bonding process.

According to an embodiment of the present disclosure, when the first plate 110 is configured in a metal material and the second plate 120 is configured in a plastic material, the second plate 120 can be coupled to (or deposited on) the first plate 110 in a semi-cured state, and then, can be cured, such that the second plate 120 can be configured (or integrated) as one body with or bonded to the first plate 110, but embodiments of the present disclosure are not limited thereto. For example, a portion of the second plate 120 can be melted by heat and can be deposited or bonded to a front surface of the first plate 110, and thus, the first plate 110 and the second plate 120 can be configured as one plate where the first plate 110 and the second plate 120 are configured (or integrated) as one body with or bonded to each other.

According to another embodiment of the present disclosure, when each of the first and second plates 110 and 120 is configured in a plastic material, the second plate 120 can be coupled to (or deposited on) the first plate 110 in a semi-cured state, and then, can be cured, whereby the second plate 120 can be configured (or integrated) as one body with or bonded to the first plate 110, but embodiments of the present disclosure are not limited thereto. For example, the first plate 110 can be coupled to (or deposited on) the second plate 120 in a semi-cured state, and then, can be cured, such that the first plate 110 can be configured (or integrated) as one body with or bonded to the second plate 120. For example, each of the first plate 110 and the second plate 120 can be coupled to (or deposited on) each other in a semi-cured state, and then, can be cured, such that the first plate 110 and the second plate 120 can be bonded to each other and configured (or integrated) as one plate.

In the vibration member 100 according to another embodiment of the present disclosure, the first plate 110 and the second plate 120 can be configured (or integrated) as one body without an intermediary medium, and thus, vibrations of one or more vibration apparatuses 500 can be transferred to the second plate 120 without loss of the vibration caused by an adhesive member. Accordingly, a vibration width (e.g., an amplitude of vibration, or a displacement width) of the second plate 120 or the vibration member 100 based on a vibration of the vibration apparatus 500 can increase, and thus, a sound characteristic and/or a sound pressure level characteristic of a sound generated based on a vibration of the vibration member 100 can be enhanced.

The vibration member 100 or the first plate 110 according to another embodiment of the present disclosure can further include one or more holes 111. The one or more holes 111 can be the same as the one or more holes 111 described above with reference to FIG. 4, and thus, repeated descriptions thereof are omitted or may be briefly discussed.

The one or more holes 111 can be configured with or can provide one or more air gaps (or one or more air pockets) between the vibration apparatus 500 and the second plate 120. The one or more holes 111 can be a space through which a sound wave generated based on a vibration of the vibration apparatus 500 is propagated (or transferred) to the second plate 120. Accordingly, a vibration width (e.g., an amplitude of vibration, or a displacement width) of the vibration member 100 based on a vibration of the second plate 120 or the vibration apparatus 500 can increase, and thus, a sound characteristic and/or a sound pressure level characteristic of a sound generated based on a vibration of the vibration member 100 can be enhanced.

Figure 6:
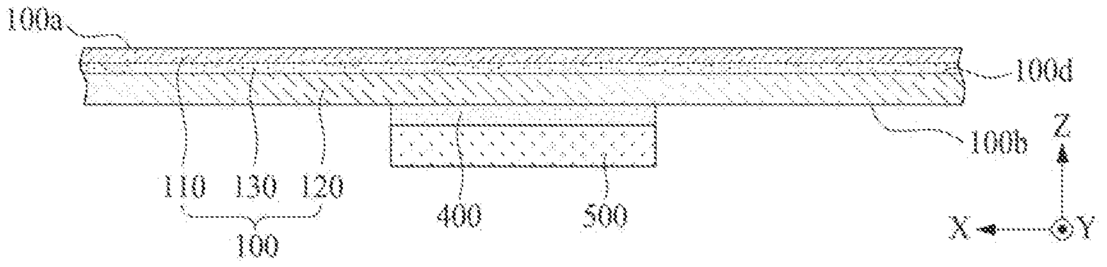
FIG. 6 illustrates a vibration member according to another embodiment of the present disclosure.

FIG. 6 illustrates a vibration member according to another embodiment of the present disclosure. Particularly, FIG. 6 is a cross-sectional view illustrating a vibration apparatus and a portion of the vibration member illustrated in FIG. 2 according to another embodiment of the present disclosure. Here, FIG. 6 illustrates an embodiment implemented by modifying a stack structure of the first and second plates of the apparatus described above with reference to FIGS. 1 to 3. In the following description, the other elements except a stack structure of first and second plates and relevant elements are referred to by like reference numerals, and repeated descriptions thereof are omitted or may be briefly discussed.

With reference to FIGS. 2 and 6, a vibration member 100 according to another embodiment (or a fourth embodiment) of the present disclosure can include a second plate 120 connected to a vibration apparatus 500 and a first plate 110 connected to the second plate 120. For example, except for a stack structure (e.g., aspect of the stack structure), the first plate 110 and the second plate 120 can be the same as or substantially the same as the first plate 110 and the second plate 120 described above with reference to FIGS. 2 and 3, and thus, only a stack structure of the first plate 110 and the second plate 120 will be described below. In the descriptions of the first plate 110 and the second plate 120 illustrated in FIGS. 2 and 3, the other descriptions except the stack structure in the first plate 110 and the second plate 120 can be included in descriptions of FIG. 6.

The first plate 110 can be configured on (or over) the second plate 120. For example, the second plate 120 can be disposed or configured between the first plate 110 and the vibration apparatus 500. For example, the first plate 110 can configure a first surface 100*a* of the vibration member 100, and the second plate 120 can configure a second surface 100*b* of the vibration member 100. For example, the first plate 110 and the second plate 120 can have a stack structure opposite to the stack structure of the first and second plates described above with reference to FIG. 3, or can have a vertically reversed stack structure. As such, among the plates 120 and 110, the thickness of the plate (e.g., 120) closer to the vibration apparatus 500 is greater than the thickness of the plate (e.g., 110) further to the vibration apparatus 500. This is opposite to the configuration shown in FIG. 3.

The second plate 120 can be configured to vibrate based on a vibration of a vibration apparatus 500. The second plate 120 can be connected or coupled to the vibration apparatus 500 by a connection member 400. The connection member 400 can be disposed or connected between the vibration apparatus 500 and the second plate 120 of the vibration member 100. For example, the vibration apparatus 500 can be connected or coupled to a rear surface 100*b* of the second plate 120 of the vibration member 100 by the connection member 400.

The first plate 110 and the second plate 120 can be configured to have different stiffnesses to each other or different Young's modulus (or elastic moduli) to each other. For example, the first plate 110 can be configured to have stiffness or a modulus which is higher than that of stiffness or a modulus of the second plate 110. For example, the first plate 110 can have a modulus of 50 Gpa (gigapascal) or more. For example, the second plate 120 can have a modulus of 10 Gpa (gigapascal) or less.

The first plate 110 according to an embodiment of the present disclosure can include one or more materials (or substance) of a metal material, fiber reinforced plastic, carbon, and glass, but embodiments of the present disclosure are not limited thereto. For example, the metal material of the first plate 110 can include one or more materials of stainless steel, aluminum (Al), an Al alloy, a magnesium (Mg), a Mg alloy, copper (Cu), a copper (Cu) alloy, and a magnesium-lithium (Mg—Li) alloy, but embodiments of the present disclosure are not limited thereto. For example, the fiber reinforced plastic can be carbon fiber reinforced plastic (CFRP), but embodiments of the present disclosure are not limited thereto.

The second plate 120 according to an embodiment of the present disclosure can be configured in or comprise a plastic material such as plastic or styrene material, but embodiments of the present disclosure are not limited thereto. For example, a plastic material of the second plate 120 can include polycarbonate, polyethylene terephthalate, polyarylate, polyethylene naphthalate, polysulfone, polyethersulfone, cyclo-olefin copolymer, or the like, but embodiments of the present disclosure are not limited thereto. For example, the styrene material can be an ABS material. The ABS material can be acrylonitrile, butadiene, and styrene.

The first plate 110 can be configured to vibrate based on a vibration of the second plate 120. The first plate 110 can be configured or positioned on (or over) the second plate 120. The second plate 120 can be disposed or configured between the first plate 110 and the vibration apparatus 500. The first plate 110 can vibrate based on a vibration of the second plate 120 to generate (or output) a sound. The first plate 110 can vibrate based on a vibration of the second plate 120 based on a vibration of the vibration apparatus 500, and thus, can generate (or output) a sound.

According to an embodiment of the present disclosure, the first plate 110 can be connected or coupled to a front surface **100*d* of the second plate 120 by an adhesive member 130. For example, the first plate 110 and the second plate 120 can be connected or coupled to each other by the adhesive member 130 described above with reference to FIG. 3**.

Figure 7:
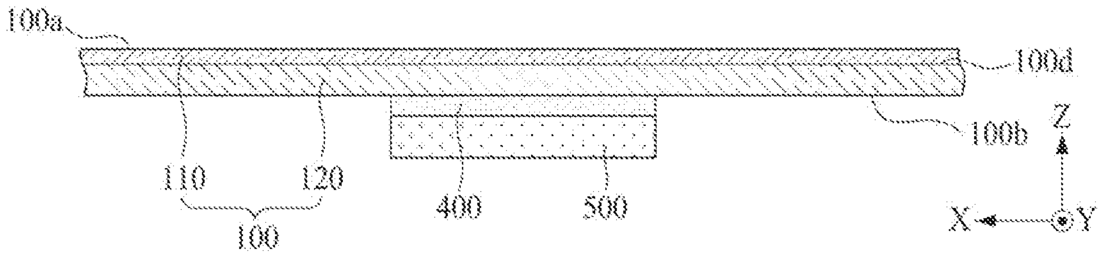
FIG. 7 illustrates a vibration member according to another embodiment of the present disclosure.

According to still another embodiment of the present disclosure, the first plate 110 and the second plate 120, as illustrated in FIG. 7, can be configured (or integrated) as one body or coupled to each other without a separate adhesive member or adhesive. For example, the first plate 110 and the second plate 120 can be directly connected or coupled to each other without an intermediary medium such as the adhesive member 130 described above with reference to FIG. 6. For example, the first plate 110 and the second plate 120 can be configured as one plate where the first and second plates 110 and 120 are configured (or integrated) as one body or bonded (or attached) to each other. The integration of the first plate 110 and the second plate 120 can be the same as or substantially the same as an integration method of the first plate 110 and the second plate 120 described above with reference to FIG. 5, and thus, repeated descriptions thereof are omitted or may be briefly discussed. For example, the integration method or the integration structure of the first plate 110 and the second plate 120 described above with reference to FIG. 5 can be included in descriptions of an integration method or an integration structure of the first plate 110 and the second plate 120 illustrated in FIG. 7.

A vibration member 100 or a second plate 120 according to another embodiment of the present disclosure can include one or more holes. One or more holes can be configured at or provided in the second plate 120 overlapping the vibration apparatus 500. One or more holes can be configured to pass through the second plate 120. Except for that the one or more holes are configured at or provided in the second plate 120, the one or more holes can be substantially the same as the one or more holes 111 described above with reference to FIG. 4, and thus, repeated descriptions thereof are omitted or may be briefly discussed.

The vibration apparatus 500 can vibrate the second plate 120 to vibrate the vibration member 100. For example, the vibration apparatus 500 can vibrate the second plate 120, and thus, can vibrate the first plate 110 (via the second plate 120) and the second plate 120 (directly). Accordingly, the vibration member 100 can generate (or output) a sound, based on vibrations of the first plate 110 and the second plate 120.

According to another embodiment of the present disclosure, a vibration of the vibration apparatus 500 can be transferred to the first plate 110 through the second plate 120, and thus, the second plate 120 can transfer a vibration of the vibration apparatus 500 to the first plate 110. For example, the second plate 120 can be disposed closer (e.g., more adjacent) to the vibration apparatus 500 than the first plate 110. For example, the second plate 120 adjacent to the vibration apparatus 500 can be configured or disposed to have a modulus which is lower than that of the first plate 110. Therefore, the first plate 110 which is not adjacent to the vibration apparatus 500 can have a modulus which is higher than that of the second plate 120, and thus, a sound pressure level characteristic and/or a sound characteristic can be further enhanced. For example, the second plate 120 can be configured in a material having a ductile (e.g., soft and/or elastic) characteristic, and thus, can balance or adjust a sound pressure level characteristic of a sound generated based on a vibration of the first plate 110. For example, the second plate 120 can be configured to decrease a dip portion and a peak portion of a sound generated by a vibration of the vibration apparatus 500 and/or the first plate 110. For example, the dip portion and the peak portion of the sound generated by the vibration of the vibration apparatus 500 and/or the first plate 110 can be reduced or removed by a ductile (e.g., soft and/or elastic) characteristic (or a low modulus) of the second plate 120. Accordingly, a dip phenomenon and a peak phenomenon in a sound generated by a vibration of the vibration member 100 can be decreased and addressed.

The apparatus including the vibration member 100 according to another embodiment of the present disclosure can generate (or output) a sound based on a vibration of the vibration member 100 including the first and second plates 110 and 120 configured in different materials to each other, and thus, a sound characteristic and/or a sound pressure level characteristic can be enhanced. Further, a dip portion and a peak portion of a sound generated based on a vibration of the vibration apparatus 500 and/or the first plate 110 can be reduced or removed by a ductile (e.g., soft and/or elastic) characteristic (or a low modulus) of the second plate 120 connected to the vibration apparatus 500. As such, in a full-pitched sound band, a sound characteristic and/or a sound pressure level characteristic can be enhanced and the sound pressure level balance and/or flatness of a sound pressure level can be enhanced.

Figure 8:
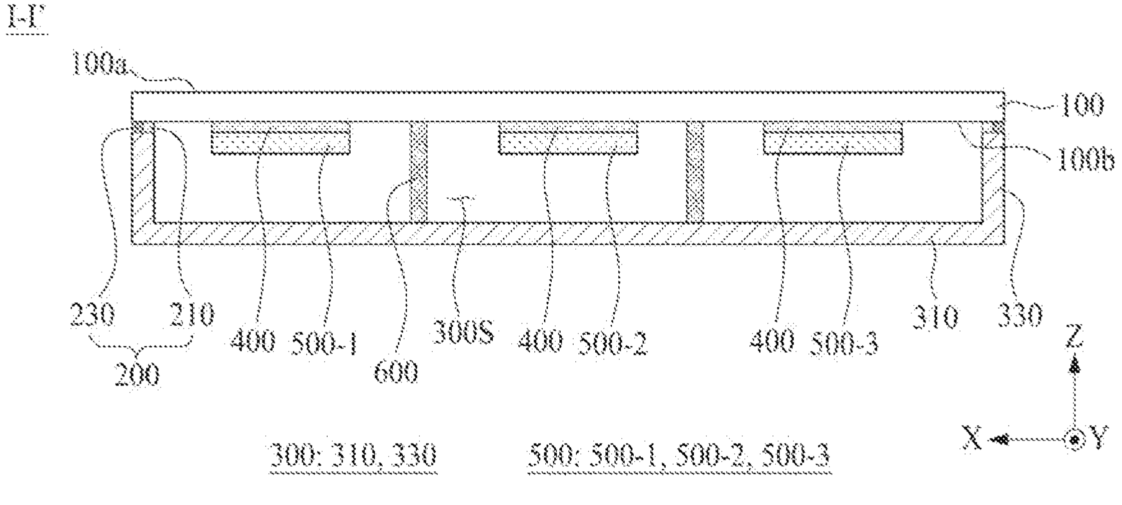
FIG. 8 illustrates an apparatus according to another embodiment of the present disclosure.

FIG. 8 illustrates an apparatus according to another embodiment of the present disclosure. Particularly, FIG. 8 is another example of a cross-sectional view taken along line I-I' illustrated in FIG. 1 according to an embodiment of the present disclosure. Here, FIG. 8 illustrates an embodiment implemented by modifying the vibration apparatus in the apparatus described above with reference to FIGS. 1 to 7. In the following description, therefore, the other elements except the vibration apparatus and relevant elements are referred to by like reference numerals, and repeated descriptions thereof are omitted or may be briefly discussed.

With reference to FIGS. 1 and 8, in an apparatus according to this embodiment of the present disclosure, a vibration apparatus 500 can include a plurality of vibration generating apparatuses 500-1, 500-2, and 500-3. As an example only, the vibration apparatus 500 can include first to third vibration generating apparatuses 500-1, 500-2, and 500-3, but embodiments of the present disclosure are not limited thereto. That is, any number of vibration generating apparatuses can be provided.

The plurality of vibration generating apparatuses 500-1, 500-2, and 500-3 can be configured or disposed at or under a vibration member 100. The plurality of vibration generating apparatuses 500-1, 500-2, and 500-3 can be configured to have a predetermined interval (or distance) along a long-side length direction of the apparatus. For example, the plurality of vibration generating apparatuses 500-1, 500-2, and 500-3 can be configured to have a predetermined interval (or distance) along a first direction (e.g., X-direction).

The plurality of vibration generating apparatuses 500-1, 500-2, and 500-3 can be connected or coupled to a second surface (or rear surface) 100*b* of the vibration member 100. For example, each of the plurality of vibration generating apparatuses 500-1, 500-2, and 500-3 can be connected or coupled to the second surface 100*b* of the vibration member 100 by a connection member 400.

Each of the plurality of vibration generating apparatuses 500-1, 500-2, and 500-3 according to an embodiment of the present disclosure can be connected or coupled to the second surface 100*b* of the first plate 110 of the vibration member 100 by the connection member 400 as described above with reference to FIGS. 3 to 5.

Each of the plurality of vibration generating apparatuses 500-1, 500-2, and 500-3 according to another embodiment of the present disclosure can be connected or coupled to the second surface 100*b* of the second plate 120 of the vibration member 100 by the connection member 400 as described above with reference to FIGS. 6 and 7.

The first vibration generating apparatus 500-1 of the plurality of vibration generating apparatuses 500-1, 500-2, and 500-3 can be configured to vibrate a first region (e.g., a left region) of the vibration member 100. For example, the first vibration generating apparatus 500-1 can vibrate the first region of the vibration member 100 to generate (or output) a first sound.

The second vibration generating apparatus 500-2 of the plurality of vibration generating apparatuses 500-1, 500-2, and 500-3 can be configured to vibrate a second region (e.g., a center region) of the vibration member 100. For example, the second vibration generating apparatus 500-2 can vibrate the second region of the vibration member 100 to generate (or output) a second sound.

The third vibration generating apparatus 500-3 of the plurality of vibration generating apparatuses 500-1, 500-2, and 500-3 can be configured to vibrate a third region (e.g., a right region) of the vibration member 100. For example, the third vibration generating apparatus 500-3 can vibrate the third region of the vibration member 100 to generate (or output) a third sound.

The first to third sounds can have the same pitch (e.g., same-pitched sound band), or can have different pitches (e.g., different-pitched sound bands). Further, if there exists a different number of vibration generating apparatuses, then the number of sounds generated would correspond to or would be the same as the number of vibration generating apparatuses provided. In another example, one or more same sounds can be generated from the vibration generating apparatuses.

The vibration member 100 can vibrate based on the vibration of each of the plurality of vibration generating apparatuses 500-1, 500-2, and 500-3 to generate (or output) first to third sounds.

The apparatus according to one or more embodiments of the present disclosure can further include a partition member 600.

The partition member 600 can be disposed or configured between the plurality of vibration generating apparatuses 500-1, 500-2, and 500-3. For example, the partition member 600 can be disposed or configured between the vibration member 100 and a supporting member 300, in a region between the plurality of vibration generating apparatuses 500-1, 500-2, and 500-3. For example, the partition member 600 can be disposed or configured between the vibration member 100 and a first supporting part 310 of the supporting member 300, in a region between the plurality of vibration generating apparatuses 500-1, 500-2, and 500-3. The partition member 600 can be disposed or configured between a second surface 100*b* of the vibration member 100 and the first supporting part 310 of the supporting member 300, in a region between the plurality of vibration generating apparatuses 500-1, 500-2, and 500-3. For example, the partition member 600 can comprise portions disposed or configured between the first to third vibration generating apparatuses 500-1, 500-2, and 500-3. Accordingly, the portions of the partition member can divide the internal space 300S between the first to third vibration generating apparatuses 500-1, 500-2, and 500-3 respectively. As such, a portion of the partition member 600 can be configured between the first vibration generating apparatus 500-1 and the second vibration generating apparatus 500-2 and another portion of the partition member 600 can be disposed between the second vibration generating apparatus 500-2 and the third vibration generating apparatus 500-3.

The partition member 600 can limit or define a vibration region by each of the plurality of vibration generating apparatuses 500-1, 500-2, and 500-3. For example, the partition member 600 can separate a sound channel or the sounds generated based on a vibration of each of the plurality of vibration generating apparatuses 500-1, 500-2, and 500-3 and therefore can minimize, prevent or decrease the reduction of a sound characteristic caused by interference of the first to third sounds. For example, the partition member 600 can be referred to as a sound blocking member, a sound separation member, a space separation member, an enclosure, a baffle, or the like, but embodiments of the present disclosure are not limited thereto.

The partition member 600 can include a material having elasticity which enables a certain degree of compression. For example, the partition member 600 can be configured as polyurethane materials or polyolefin materials, but embodiments of the present disclosure are not limited thereto.

The apparatus according to another embodiment of the present disclosure, like the apparatus described above with reference to FIGS. 1 to 7, can generate (or output) a sound based on a vibration of the vibration member 100 configured as multiple different materials, and thus, a sound characteristic and/or a sound pressure level characteristic can be enhanced. Further, the apparatus according to another embodiment of the present disclosure can generate (or output) a stereo sound or a stereophonic sound, based on a vibration of the vibration member 100 by a vibration of each of the plurality of vibration generating apparatuses 500-1, 500-2, and 500-3 provided at a predetermined interval (or distance) along a long-side length direction of the apparatus. Moreover, in the apparatus according to another embodiment of the present disclosure, sounds or sound channels generated based on vibrations of the plurality of vibration generating apparatuses 500-1 to 500-3 can be separated by one or more partition members 600, and thus, a stereo sound characteristic or a stereophonic sound characteristic can be enhanced. In an example, the partition member(s) 600 can be provided only as needed basis among the plurality of vibration generating apparatuses 500-1, 500-2, and 500-3.

Figure 9:
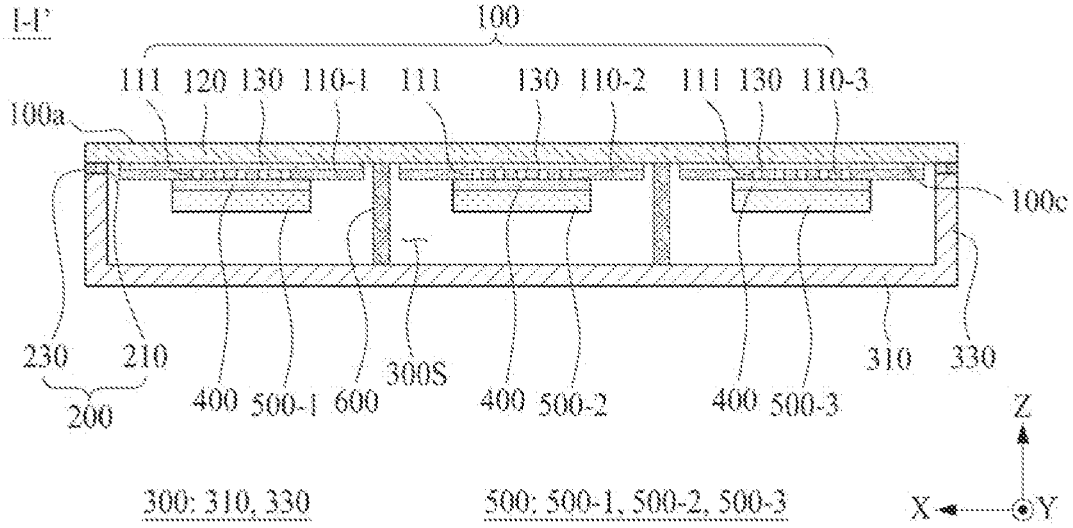
FIG. 9 illustrates an apparatus according to another embodiment of the present disclosure.
Figure 10:
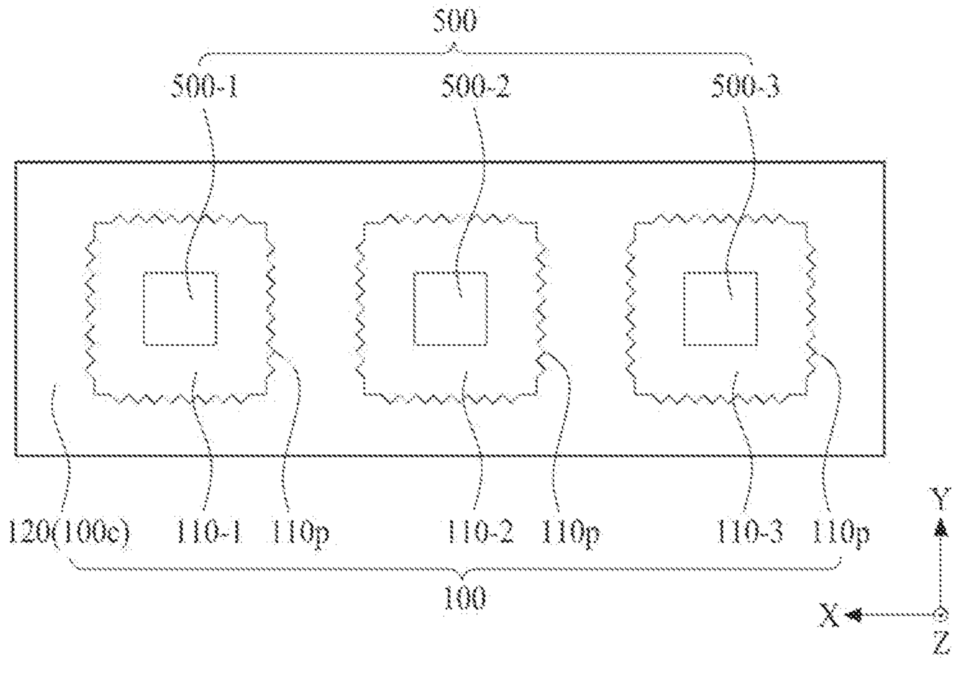
FIG. 10 illustrates a rear surface of the vibration member illustrated in FIG. 9.

FIG. 9 illustrates an apparatus according to another embodiment of the present disclosure. Particularly, FIG. 9 is another example of a cross-sectional view taken along line I-I' illustrated in FIG. 1 according to an embodiment of the present disclosure. Further, FIG. 10 illustrates a rear surface of the vibration member illustrated in FIG. 9. FIGS. 9 and 10 illustrate an embodiment implemented by modifying the vibration member in the apparatus described above with reference to FIG. 8. In the following description, therefore, the other elements except the vibration member and relevant elements are referred to by like reference numerals, and repeated descriptions thereof are omitted or may be briefly discussed.

With reference to FIGS. 1, 9, and 10, in an apparatus according to another embodiment of the present disclosure, a vibration member 100 can include a plurality of first plates 110-1, 110-2, and 110-3 and a second plate 120.

The plurality of first plates 110-1, 110-2, and 110-3 can be configured or disposed at a rear surface of the vibration member 100. The plurality of first plates 110-1, 110-2, and 110-3 can be configured to have a predetermined interval (or distance) along a long-side length direction of the apparatus or a first direction X, and can be separated from and spaced apart from each other. The predetermined interval may be the same predetermined interval at which the plurality of vibration generating apparatuses 500-1, 500-2, and 500-3 are provided. As an example, each of the plurality of first plates 110-1, 110-2, and 110-3 can be a lower plate, a sub-plate, or a local plate.

The plurality of first plates 110-1, 110-2, and 110-3 can be connected or coupled to one vibration generating apparatus of the plurality of vibration generating apparatuses 500-1, 500-2, and 500-3, respectively. For example, each of a plurality of vibration generating apparatuses 500-1, 500-2, and 500-3 can be connected or coupled to a rear surface 100*b* of a corresponding one of the plurality of first plates 110-1, 110-2, and 110-3 by a connection member 400. Each of the plurality of first plates 110-1, 110-2, and 110-3 can individually or independently vibrate based on a vibration of a vibration generating apparatus, connected thereto, among the vibration generating apparatuses 500-1, 500-2, and 500-3. Thus, vibration interference (or constructive interference) between the plurality of first plates 110-1, 110-2, and 110-3 can be prevented or minimized.

Each of the plurality of first plates 110-1, 110-2, and 110-3 can have a size (or area) which is greater than that of each of the plurality of vibration generating apparatuses 500-1, 500-2, and 500-3. Each of the plurality of first plates 110-1, 110-2, and 110-3 can have the same or similar shape as that of each of the plurality of vibration generating apparatuses 500-1, 500-2, and 500-3, but embodiments of the present disclosure are not limited thereto. Each of the plurality of first plates 110-1, 110-2, and 110-3 can include a rectangular shape, a square shape, a circular shape, or an oval shape, but embodiments of the present disclosure are not limited thereto.

The second plate 120 can be configured to support the plurality of first plates 110-1, 110-2, and 110-3. The second plate 120 can be coupled to a supporting member 300 by a coupling member 200. For example, a rear periphery portion of the second plate 120 can be coupled to a second supporting part 330 of the supporting member 300 by the coupling member 200.

The second plate 120 can be connected or coupled to each of the plurality of first plates 110-1, 110-2, and 110-3. The second plate 120 can be connected or coupled to the plurality of first plates 110-1, 110-2, and 110-3 in common. The second plate 120 can be a top plate, a main plate, or a common plate, but embodiments of the present disclosure are not limited thereto. For instance, a single second plate 120 supports or covers the multiple first plates 110.

According to an embodiment of the present disclosure, a rear surface 100*c* of the second plate 120 can be connected or coupled to each of the plurality of first plates 110-1, 110-2, and 110-3 by an adhesive member 130.

According to another embodiment of the present disclosure, each of the plurality of first plates 110-1, 110-2, and 110-3 and the second plate 120 may be configured (or integrated) as one body or coupled to each other without a separate adhesive member or adhesive, as described above in connection with FIG. 5. For example, each of the plurality of first plates 110-1, 110-2, and 110-3 and the second plate 120 can be directly connected or coupled to each other without an intermediary medium such as the adhesive member 130. For example, each of the plurality of first plates 110-1, 110-2, and 110-3 and the second plate 120 can be configured as one plate where each of the plurality of the first plates 110-1, 110-2, and 110-3 and the second plate 120 are configured (or integrated) as one body or bonded (or attached) to each other. The integration of each of the plurality of first plates 110-1, 110-2, and 110-3 with the second plate 120 can be the same as or substantially the same as an integration method of the first plate 110 and the second plate 120 described above with reference to FIG. 5 and thus, repeated descriptions thereof are omitted or may be briefly discussed.

The second plate 120 can generate (or output) a region-based sound through region-based division vibration based on a vibration of each of the plurality of first plates 110-1, 110-2, and 110-3.

The vibration member 100 according to another embodiment of the present disclosure can output a region-based sound, based on a division vibration by a vibration of each of the plurality of first plates 110-1, 110-2, and 110-3, and thus, a sound characteristic and/or a sound pressure level characteristic generated from a vibration of the vibration member 100 can be enhanced.

Each of the vibration member 100 and the plurality of first plates 110-1, 110-2, and 110-3 according to another embodiment of the present disclosure can include one or more holes 111. One or more holes 111 can be configured at each of the plurality of first plates 110-1, 110-2, and 110-3 overlapping each of the plurality of vibration generating apparatuses 500-1, 500-2, and 500-3. One or more holes 111 can be configured to pass through each of the plurality of first plates 110-1, 110-2, and 110-3. Except for that the one or more holes 111 are configured at each of the plurality of first plates 110-1, 110-2, and 110-3, the one or more holes 111 can be substantially the same as the one or more holes 111 described above with reference to FIGS. 4 and 5, and thus, repeated descriptions thereof are omitted or may be briefly discussed.

Referring to FIG. 10, the vibration member 100 or the first plate 110 according to another embodiment of the present disclosure can include one or more protrusion parts 110*p*. For example, each of the plurality of first plates 110-1, 110-2, and 110-3 can include one or more protrusion parts 110*p*. For example, the one or more protrusion parts 110*p* can be a protrusion pattern, but embodiments of the present disclosure are not limited thereto.

The one or more protrusion parts **110*p* can protrude from one or more lateral surface (or sidewall) of each of the plurality of first plates 110-1, 110-2, and 110-3. For example, the one or more protrusion parts 110*p* can be configured along a perimeter of each of the plurality of first plates 110-1, 110-2, and 110-3. The one or more protrusion parts 110*p* can protrude along a first direction X (e.g., X-direction) and/or a second direction Y (e.g., Y-direction) from a lateral surface (or a sidewall) of each of the plurality of first plates 110-1, 110-2, and 110-3. For example, the one or more protrusion parts 110*p*** can have a triangular shape or a saw-toothed shape, but embodiments of the present disclosure are not limited thereto.

The one or more protrusion parts **110*p* can absorb or trap a reflected wave generated through reflection by the coupling member 200, and thus, can prevent or minimize a reduction in sound pressure level characteristic caused by a standing wave generated in the internal space 300S by the interference of a reflected wave and a progressive wave originating from the plurality of vibration generating apparatuses 500-1, 500-2, and 500-3. For example, a reflected wave reflected from the coupling member 200 based on a vibration of the vibration member 100 can be dispersed or reflected by the one or more protrusion parts 110*p***, and thus, an overlap and interference phenomenon between a reflected wave and a progressive wave can be prevented or minimized, thereby preventing or minimizing the occurrence of a standing wave.

Further, the partition member 600 can be disposed or configured between the vibration member 100 and the supporting member 300, in regions between the plurality of vibration generating apparatuses 500-1, 500-2, and 500-3. For example, the partition member 600 can be disposed or configured between the vibration member 100 and a first supporting part 310 of the supporting member 300, in a region between the plurality of vibration generating apparatuses 500-1, 500-2, and 500-3. The partition member 600 can be disposed or configured between a second surface (or rear surface) **100*b* of the vibration member 100 and the first supporting part 310 of the supporting member 300, in regions between the plurality of vibration generating apparatuses 500-1, 500-2, and 500-3. For example, the partition member 600 can be disposed or configured between a rear surface 100*c* of the second plate 120 of the vibration member 100 and the first supporting part 310 of the supporting member 300, in regions between the plurality of vibration generating apparatuses 500-1, 500-2, and 500-3**.

The portions of the partition member may divide the internal space 300S between the plurality of first plates 110-1, 110-2, and 110-3 respectively. For instance, the partition member 600 can be disposed between the plurality of first plates 110-1, 110-2, and 110-3. Accordingly, the partition member 600 can prevent or block interference of vibration between each of the plurality of first plates 110-1, 110-2, and 110-3.

The apparatus according to another embodiment of the present disclosure can have the same or similar effect as that of the apparatus described above with reference to FIG. 8. Further, the apparatus according to another embodiment of the present disclosure can generate (or output) a stereo sound or a stereophonic sound, based on a vibration of the second plate 120 and an individual vibration of each of the plurality of first plates 110-1, 110-2, and 110-3 by a vibration of each of the plurality of vibration generating apparatuses 500-1, 500-2, and 500-3, and thus, a stereo sound characteristic or a stereophonic sound characteristic can be further enhanced by an individual vibration of each of the plurality of first plates 110-1, 110-2, and 110-3.

Figure 11:
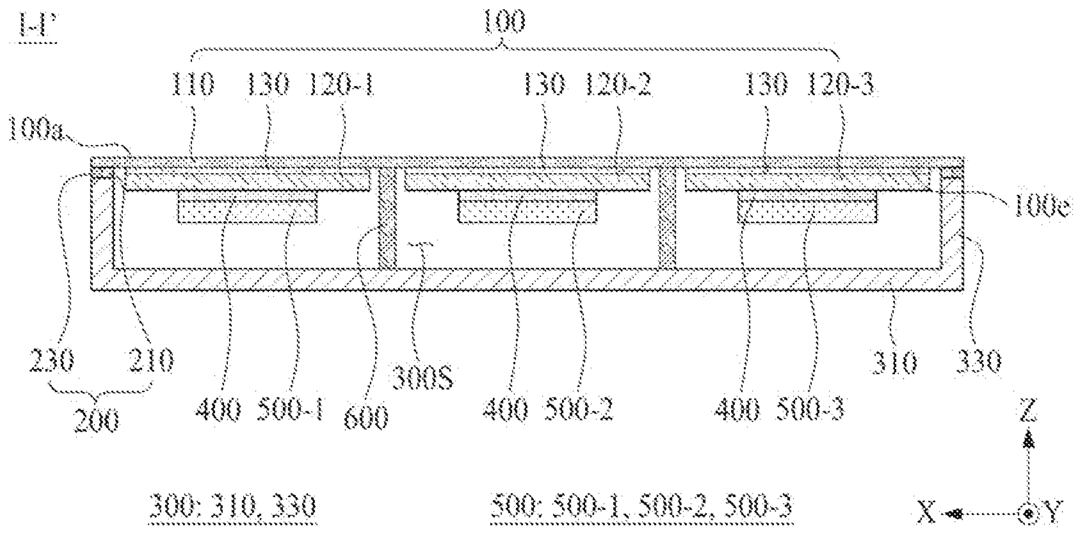
FIG. 11 illustrates an apparatus according to another embodiment of the present disclosure.
Figure 12:
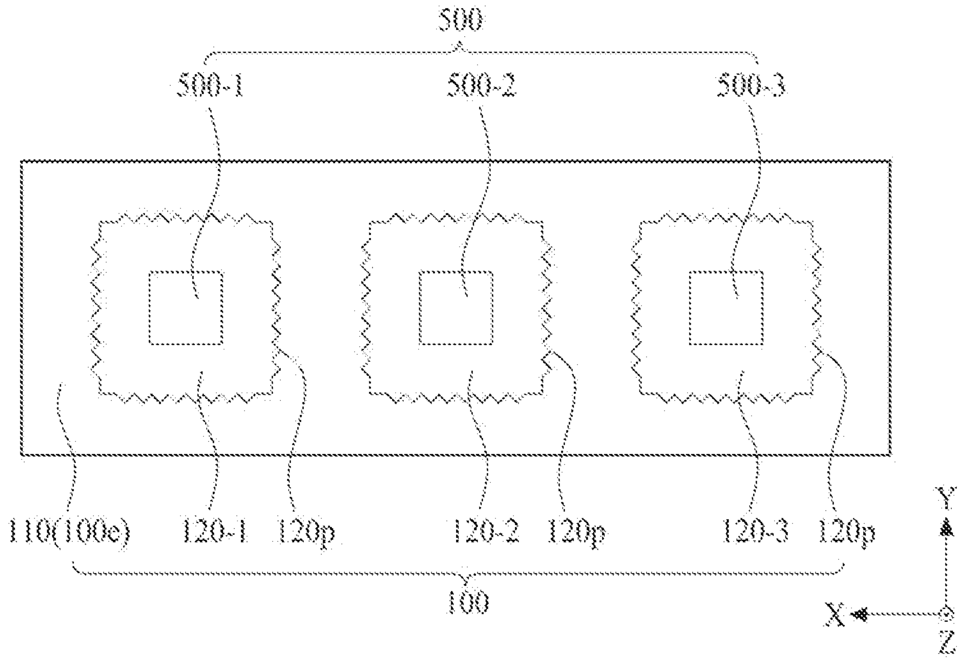
FIG. 12 illustrates a rear surface of the vibration member illustrated in FIG. 11.

FIG. 11 illustrates an apparatus according to another embodiment of the present disclosure. Particularly, FIG. 11 is another cross-sectional view taken along line I-I' illustrated in FIG. 1 according to another embodiment of the present disclosure. Further, FIG. 12 illustrates a rear surface of the vibration member illustrated in FIG. 11. Here, FIGS. 11 and 12 illustrate an embodiment implemented by modifying the vibration member in the apparatus described above with reference to FIGS. 9 and 10. In the following description, therefore, the other elements except the vibration member and relevant elements are referred to like by reference numerals, and repeated descriptions thereof are omitted or may be briefly discussed.

With reference to FIGS. 1, 11, and 12, in an apparatus according to another embodiment of the present disclosure, a vibration member 100 can include a plurality of second plates 120-1, 120-2, and 120-3 and a first plate 110 (one first plate 110). The plurality of second plates 120-1, 120-2, and 120-3 can be configured or disposed at a rear surface of the vibration member 100. The plurality of second plates 120-1, 120-2, and 120-3 is also referred to herein as a plurality of second sub-plates 120-1, 120-2, and 120-3, where the plurality of second sub-plates 120-1, 120-2, and 120-3 are comprised by a second plate.

The plurality of second plates 120-1, 120-2, and 120-3 can be spaced apart from one another (e.g., spaced apart from one another horizontally or in a first direction X). For instance, the plurality of second plates 120-1, 120-2, and 120-3 can be configured to have a predetermined interval (or distance) along a long-side length direction of the apparatus, and are spaced apart and separated from each other. For example, the plurality of second plates 120-1, 120-2, and 120-3 can be configured to have a predetermined interval (or distance) along a first direction X (e.g., X-direction) or a long-side length direction of the apparatus. The predetermined interval may be the same predetermined interval at which the plurality of vibration generating apparatuses 500-1, 500-2, and 500-3 are provided. As an example, each of the plurality of second plates 120-1, 120-2, and 120-3 can be a lower plate, a sub-plate, or a local plate, but embodiments of the present disclosure are not limited thereto.

The plurality of second plates 120-1, 120-2, and 120-3 can be connected or coupled to one vibration generating apparatus of the plurality of vibration generating apparatuses 500-1, 500-2, and 500-3, respectively. For example, each of the plurality of vibration generating apparatuses 500-1, 500-2, and 500-3 can be connected or coupled to a rear surface of a corresponding one of the plurality of second plates 120-1, 120-2, and 120-3 by a connection member 400. Each of the plurality of second plates 120-1, 120-2, and 120-3 can individually or independently vibrate based on a vibration of a vibration generating apparatus, connected thereto, of the vibration generating apparatuses 500-1, 500-2, and 500-3, and thus, vibration interference (e.g., constructive or destructive interference) between the plurality of second plates 120-1, 120-2, and 120-3 can be prevented.

Each of the plurality of second plates 120-1, 120-2, and 120-3 can have a size (or area) which is greater than that of each of the plurality of vibration generating apparatuses 500-1, 500-2, and 500-3. Each of the plurality of second plates 120-1, 120-2, and 120-3 can have the same or similar shape as that of each of the plurality of vibration generating apparatuses 500-1, 500-2, and 500-3, but embodiments of the present disclosure are not limited thereto. Each of the plurality of second plates 120-1, 120-2, and 120-3 can include a rectangular shape, a square shape, a circular shape, a triangular shape, an oval shape, or any other suitable shape and size, but embodiments of the present disclosure are not limited thereto.

The first plate 110 can be configured to support the plurality of second plates 120-1, 120-2, and 120-3. The first plate 110 can be coupled to a supporting member 300 by a coupling member 200. For example, a rear periphery portion of the first plate 110 can be coupled to a second supporting part 330 of the supporting member 300 by the coupling member 200.

The first plate 110 can be connected or coupled to each of the plurality of second plates 120-1, 120-2, and 120-3. The first plate 110 can be connected or coupled to the plurality of second plates 120-1, 120-2, and 120-3 in common. The first plate 110 can be a top plate, a main plate, or a common plate, but embodiments of the present disclosure are not limited thereto.

According to an embodiment of the present disclosure, a rear surface **100*e* of the first plate 110 can be connected or coupled to each of the plurality of second plates 120-1, 120-2, and 120-3 by an adhesive member 130**.

According to another embodiment of the present disclosure, each of the plurality of second plates 120-1, 120-2, and 120-3 and the first plate 110 can be configured (or integrated) as one body or coupled to each other without a separate adhesive member or adhesive, as described above in connection with FIG. 7. For example, each of the plurality of second plates 120-1, 120-2, and 120-3 and the firs plate 110 can be directly connected or coupled to each other without an intermediary medium such as the adhesive member 130. For example, each of the plurality of second plates 120-1, 120-2, and 120-3 and the first plate 110 can be configured as one plate where each of the plurality of second plates 120-1, 120-2, and 120-3 and the first plate 110 are configured (or integrated) as one body or bonded (or attached) to each other. The integration of each of the plurality of second plates 120-1, 120-2, and 120-3 with the first plate 110 can be the same as or substantially the same as an integration method of the first plate 110 and the second plate 120 described above with reference to FIG. 5, and thus, repeated descriptions thereof are omitted or may be briefly discussed.

The first plate 110 can generate (or output) at least one region-based sound by region-based division vibration based on a vibration of each of the plurality of second plates 120-1, 120-2, and 120-3. For instance, the first plate 110 can generate (or output) a first sound at a first region of the vibration member 100, the first plate 110 can generate (or output) a second sound at a second region of the vibration member 100, and the first plate 110 may generate (or output) a third sound at a third region of the vibration member 100. The first to third regions of the vibration member 100 may substantially be the respective regions at which the plurality of vibration generating apparatuses 500-1, 500-2, and 500-3 can be configured to vibrate the vibration member 100.

The vibration member 100 according to another embodiment of the present disclosure can output at least region-based sound, based on a division vibration by the separate vibration of each of the plurality of second plates 120-1, 120-2, and 120-3 and thus, a sound characteristic and/or a sound pressure level characteristic generated from a vibration of the vibration member 100 can be enhanced.

Referring to FIG. 12, the vibration member 100 according to another embodiment of the present disclosure can include one or more protrusion parts **120*p*. For example, each of the plurality of second plates 120-1, 120-2, and 120-3 can include one or more protrusion parts 120*p* optionally provided along the periphery or perimeter of the each of the plurality of first plates 110-1, 110-2, and 110-3** or at least a portion thereof.

The one or more protrusion parts **120*p* can protrude from one or more lateral surface (or perimeter, periphery, or sidewall) of each of the plurality of second plates 120-1, 120-2, and 120-3. The one or more protrusion parts 120*p* can protrude along the first direction X or the second direction Y from a lateral surface (or perimeter, periphery, or a sidewall) of each of the plurality of second plates 120-1, 120-2, and 120-3. For example, the one or more protrusion parts 120*p*** can have a triangular shape or a saw-toothed shape, but embodiments of the present disclosure are not limited thereto.

The one or more protrusion parts **120*p* can absorb or trap a reflected wave generated through reflection by the coupling member 200, and thus, can prevent or minimize a reduction in sound pressure level characteristic caused by a standing wave generated by interference of a reflected wave and a progressive wave. For example, a reflected wave reflected from the coupling member 200 based on a vibration of the vibration member 100 can be dispersed or reflected by the one or more protrusion parts 120*p***, and thus, an overlap and interference phenomenon between a reflected wave and a progressive wave can be prevented or minimized, thereby preventing or minimizing the occurrence of a standing wave.

The partition member 600 can be disposed or configured between the vibration member 100 and the supporting member 300, in regions between the plurality of vibration generating apparatuses 500-1, 500-2, and 500-3. For example, the partition member 600 can be disposed or configured between the vibration member 100 and a first supporting part 310 of the supporting member 300, in regions between the plurality of vibration generating apparatuses 500-1, 500-2, and 500-3. For example, the partition member 600 can be disposed or configured between the rear surface **100*e* of the first plate 110 and the first supporting part 310 of the supporting member 300, in regions between the plurality of vibration generating apparatuses 500-1, 500-2, and 500-3. The partition member 600 can be disposed or configured between the firs plate 110 of the vibration member 100 and the supporting member 300, in regions between the plurality of vibration generating apparatuses 500-1, 500-2, and 500-3. For example, the partition member 600 can be disposed or configured between the first plate 110 of the vibration member 100 and the first supporting part 310 of the supporting member 300, in a region between the plurality of vibration generating apparatuses 500-1, 500-2, and 500-3. For example, the partition member 600 can be disposed or configured between the rear surface 100*e* of the first plate 110 of the vibration member 100 and the first supporting part 310 of the supporting member 300, in regions between the plurality of vibration generating apparatuses 500-1, 500-2, and 500-3**.

The portions of the partition member may divide the internal space 300S between the plurality of first plates 110-1, 110-2, and 110-3 respectively. For instance, the partition member 600 can be disposed between the plurality of second plates 120-1, 120-2, and 120-3. Accordingly, the partition member 600 can prevent or block interference of a vibration between each of the plurality of second plates 120-1, 120-2, and 120-3. The location and configuration of the partition member 600 can be the same or similar to the partition member described above in connection with other embodiments of the present disclosure.

The apparatus according to another embodiment of the present disclosure as shown in FIGS. 11 and 12 can have the same or similar effect as that of the apparatus described above with reference to FIG. 8. Further, the apparatus according to another embodiment of the present disclosure can generate (or output) a stereo sound or a stereophonic sound, based on a vibration of the second plate 120 and an individual vibration of each of the plurality of second plates 120-1, 120-2, and 120-3 by a vibration of each of the plurality of vibration generating apparatuses 500-1, 500-2, and 500-3 and thus, a stereo sound characteristic or a stereophonic sound characteristic can be more enhanced by an individual vibration of each of the plurality of second plates 120-1, 120-2, and 120-3.

Figure 13:
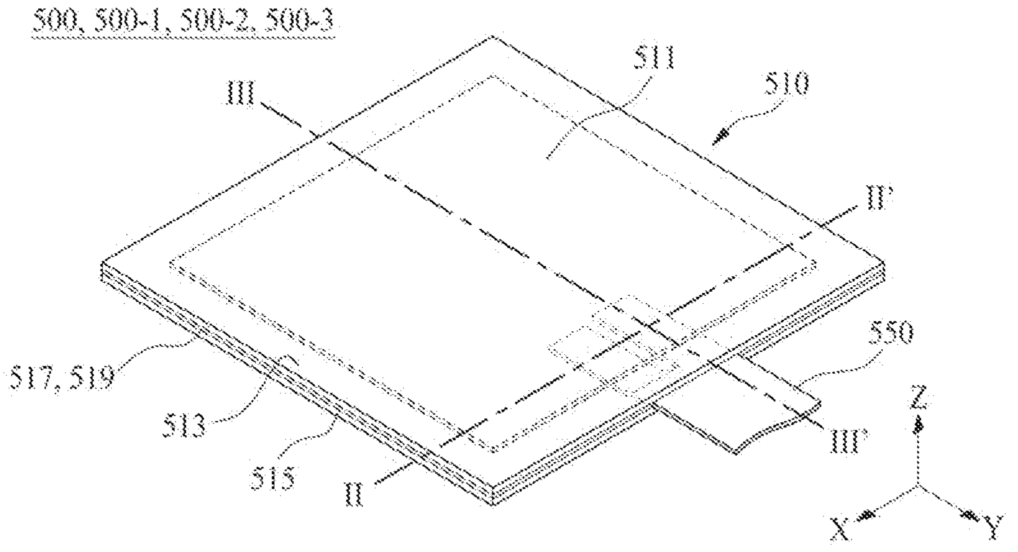
FIG. 13 illustrates a vibration apparatus according to an embodiment of the present disclosure.
Figure 14:
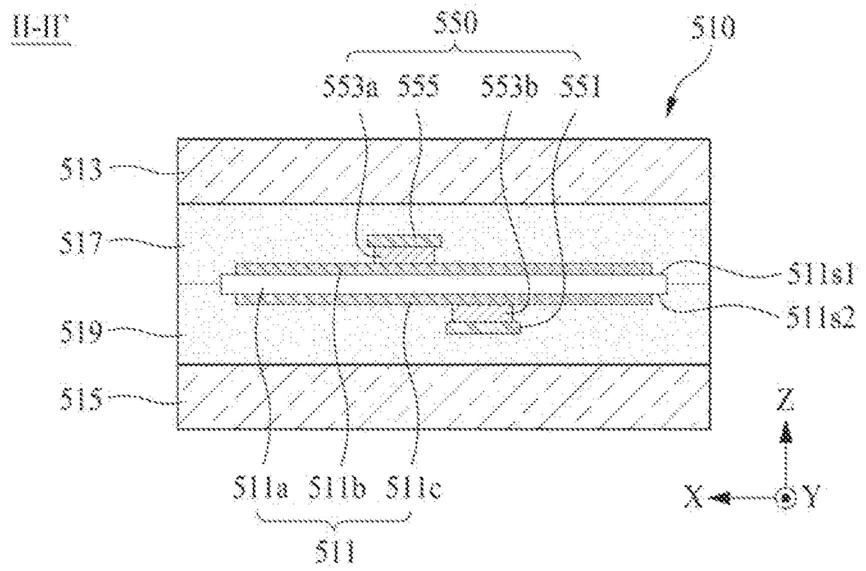
FIG. 14 is a cross-sectional view taken along line II-II' illustrated in FIG. 13 according to an embodiment of the present disclosure.
Figure 15:
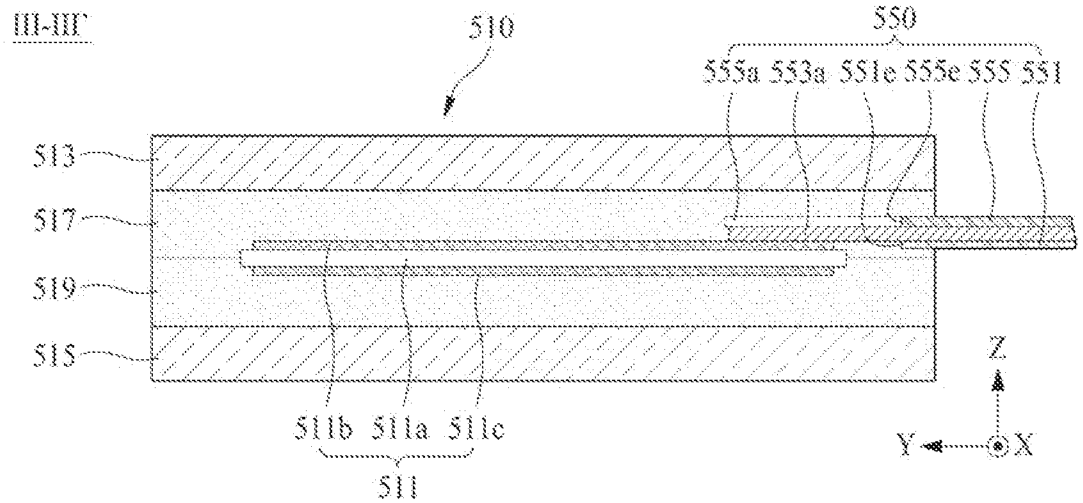
FIG. 15 is a cross-sectional view taken along line III-III' illustrated in FIG. 13 according to an embodiment of the present disclosure.

FIG. 13 illustrates a vibration apparatus according to an embodiment of the present disclosure. FIG. 14 is a cross-sectional view taken along line II-II' illustrated in FIG. 13 according to an embodiment of the present disclosure. FIG. 15 is a cross-sectional view taken along line III-III' illustrated in FIG. 13 according to an embodiment of the present disclosure. FIGS. 13 to 15 illustrate examples of the vibration apparatus or the plurality of vibration generating apparatuses described above with reference to FIGS. 1 to 12.

With reference to FIGS. 13 to 15, the vibration apparatus 500 or each of the plurality of vibration generating apparatuses 500-1, 500-2, and 500-3 can include a vibration generating part 510.

The vibration generating part 510 can include a piezoelectric material having a piezoelectric characteristic. The vibration generating part 510 can be configured as a ceramic-based piezoelectric material for implementing a relatively strong vibration, or can be configured as a piezoelectric ceramic having a perovskite-based crystal structure. For example, the vibration generating part 510 can be a vibration generating device, a vibration film, a vibration generating film, a vibrator, a vibration generator, an active vibrator, an active vibration generator, an actuator, an exciter, a film actuator, a film exciter, an ultrasonic actuator, an active vibration member, or the like, but embodiments of the present disclosure are not limited thereto.

The vibration generating part 510 according to an embodiment of the present disclosure can include a vibration part 511.

The vibration part 511 can be configured to vibrate in response to a driving signal due to the piezoelectric effect. The vibration part 511 can include at least one or more of a piezoelectric inorganic material and a piezoelectric organic material. For example, the vibration part 511 can be a vibration element, a piezoelectric device, a piezoelectric element, a piezoelectric device part, a piezoelectric device layer, a piezoelectric structure, a piezoelectric vibration part, or a piezoelectric vibration layer, but embodiments of the present disclosure are not limited thereto.

The vibration part 511 according to an embodiment of the present disclosure can include a vibration layer 511*a*, a first electrode layer 511*b*, and a second electrode layer 511*c*.

The vibration layer 511*a* can include a piezoelectric material or an electroactive material which includes a piezoelectric effect. For example, the piezoelectric material can have a characteristic in which, when a pressure or twisting phenomenon is applied to a crystalline structure by an external force, a potential difference occurs due to dielectric polarization caused by a relative position change of a positive (+) ion and a negative (−) ion, and thus a vibration is generated by an electric field based on a reverse voltage applied thereto. For example, the vibration layer 511*a* can be a piezoelectric layer, a piezoelectric material layer, an electroactive layer, a piezoelectric composite layer, a piezoelectric composite, or a piezoelectric ceramic composite, or the like, but embodiments of the present disclosure are not limited thereto.

The vibration layer 511*a* can be configured as a ceramic-based material for implementing a relatively strong vibration (e.g., high amplitude vibration), or can be configured as a piezoelectric ceramic having a perovskite-based crystalline structure. The perovskite crystalline structure can have a piezoelectric effect and/or an inverse piezoelectric effect and can be a plate-shaped structure having orientation, for example, in the plane defined by the X and Y directions.

The piezoelectric ceramic can be configured as a single crystalline ceramic having a crystalline structure, or can be configured as a ceramic material having a polycrystalline structure or polycrystalline ceramic. A piezoelectric material including the single crystalline ceramic can include $\alpha$-$AlPO_4$, $\alpha$-$SiO_2$, $LiNbO_3$, $Tb_2(MoO_4)_3$, $LizB_4O_7$, or ZnO, but embodiments of the present disclosure are not limited thereto. A piezoelectric material including the polycrystalline ceramic can include a lead zirconate titanate (PZT)-based material, including lead (Pb), zirconium (Zr), and/or titanium (Ti), or can include a lead zirconate nickel niobate (PZNN)-based material, including lead (Pb), zirconium (Zr), nickel (Ni), and/or niobium (Nb), but embodiments of the present disclosure are not limited thereto. For example, the vibration layer 511*a* can include at least one or more of calcium titanate ($CaTiO_3$), barium titanate ($BaTiO_3$), and strontium titanate ($SrTiO_3$), without lead (Pb), but embodiments of the present disclosure are not limited thereto.

The first electrode layer 511*b* can be disposed at a first surface (or an upper surface or a front surface) 511*s*1 of the vibration layer 511*a*. The first electrode layer 511*b* can have the same size as that of the vibration layer 511*a*, or can have a size which is smaller than that of the vibration layer 511*a*.

The second electrode layer 511*c* can be disposed at a second surface (or a lower surface or a rear surface) 511*s*2 which is opposite to or different from the first surface 511*s*1 of the vibration layer 511*a*. The second electrode layer 511*c* can have the same size as that of the vibration layer 511*a*, or can have a size which is smaller than that of the vibration layer 511*a*. For example, the second electrode layer 511*c* can have a same or similar shape as the vibration layer 511*a*, but embodiments of the present disclosure are not limited thereto.

According to an embodiment of the present disclosure, in order to prevent electrical short circuit between the first electrode layer 511*b* and the second electrode layer 511*c*, each of the first electrode layer 511*b* and the second electrode layer 511*c* can be formed at another portion, except a periphery portion, of the vibration layer 511*a*. That is, the periphery portion of the vibration layer can be free of the first electrode layer 511*b* and the second electrode layer 511*c* or the first electrode layer 511*b* and the second electrode layer 511*c* cannot be formed at the periphery portion of the vibration layer. For example, the first electrode layer 511*b* can be formed at an entire first surface 511*s*1, other than a periphery portion, of the vibration layer 511*a*. For example, the second electrode layer 511*c* can be formed at an entire second surface 511*s*2, other than a periphery portion, of the vibration layer 511*a*. For example, a distance between a lateral surface (or a periphery, perimeter or sidewall) of each of the first electrode layer 511*b* and the second electrode layer 511*c* and a lateral surface (or a periphery, perimeter or sidewall) of the vibration layer 511*a* can be at least 0.5 mm or more. Alternatively, the distance between the lateral surface of each of the first electrode layer 511*b* and the second electrode layer 511*c* and the lateral surface of the vibration layer 511*a* can be at least 1 mm or more, but embodiments of the present disclosure are not limited thereto.

According to an embodiment of the present disclosure, one or more of the first electrode layer 511*b* and the second electrode layer 511*c* can be formed of a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or silver (Ag) including glass frit, or the like, or can be made of an alloy thereof, but embodiments of the present disclosure are not limited thereto. For example, to enhance an electrical characteristic and/or a vibration characteristic of the vibration layer 511*a*, each of the first electrode layer 511*b* and the second electrode layer 511*c* can include silver (Ag) having a low resistivity. For example, carbon can include one or more of carbon black, ketjen black, carbon nanotube, and a carbon material including graphite, but embodiments of the present disclosure are not limited thereto.

The vibration layer 511*a* can be polarized (or poling) by a certain voltage applied to the first electrode layer 511*b* and the second electrode layer 511*c* in a certain temperature atmosphere, or a temperature atmosphere that can be changed from a high temperature to a room temperature, but embodiments of the present disclosure are not limited thereto. For example, a polarization direction (or a poling direction) formed in the vibration layer 511*a* can be formed or aligned (or arranged) from the first electrode layer 511*b* to the second electrode layer 511*c*, but is not limited thereto, and a polarization direction (or a poling direction) formed in the vibration layer 511*a* can be formed or aligned (or arranged) from the second electrode layer 511*c* to the first electrode layer 511*b*.

The vibration layer 511*a* can alternately and repeatedly contract and/or expand due to an inverse piezoelectric effect according to a driving signal applied to the first electrode layer 511*b* and the second electrode layer 511*c* from the outside to vibrate. For example, the vibration layer 511*a* can vibrate in a vertical direction (or thickness direction) and in a planar direction by the signal applied to the first electrode layer 511*b* and the second electrode layer 511*c*. The vibration layer 511*a* can be displaced (or vibrated or driven) by contraction and/or expansion of the planar direction, thereby improving a sound characteristic and/or a sound pressure level characteristic of the vibration generating part 510.

The vibration generating part 510 according to an embodiment of the present disclosure can further include a first cover member 513 and a second cover member 515.

The first cover member 513 can be disposed at a first surface of the vibration part 511. For example, the first cover member 513 can be configured to cover the first electrode layer 511*b* of the vibration part 511. For example, the first cover member 513 can be configured to have a larger size than the vibration part 511. The first cover member 513 can be configured to protect the first surface of the vibration part 511 and the first electrode layer 511*b*.

The second cover member 515 can be disposed at a second surface of the vibration part 511. For example, the second cover member 515 can be configured to cover the second electrode layer 511*c* of the vibration part 511. For example, the second cover member 515 can be configured to have a larger size than the vibration part 511. The second cover member 515 can be configured to protect the second surface of the vibration part 511 and the second electrode layer 511*c*.

Each of the first cover member 513 and the second cover member 515 can include the same material or a different material. For example, one or each of the first cover member 513 and the second cover member 515 can be or include a polyimide film or a polyethylene terephthalate film, but embodiments of the present disclosure are not limited thereto.

The first cover member 513 can be connected or coupled to the first surface of the vibration part 511 or the first electrode layer 511*b* by a first adhesive layer 517. For example, the first cover member 513 can be connected or coupled to the first surface of the vibration part 511 or the first electrode layer 511*b* by a film laminating process by the first adhesive layer 517.

The second cover member 515 can be connected or coupled to the second surface of the vibration part 511 or the second electrode layer 511*c* by a second adhesive layer 519. For example, the second cover member 515 can be connected or coupled to the second surface of the vibration part 511 or the second electrode layer 511*c* by a film laminating process by the second adhesive layer 519.

Each of the first adhesive layer 517 and second adhesive layer 519 according to an embodiment of the present disclosure can include an electrically insulating material which has adhesiveness and is capable of compression and decompression. For example, each of the first adhesive layer 517 and the second adhesive layer 519 can include an epoxy resin, an acrylic resin, a silicone resin, or a urethane resin, but embodiments of the present disclosure are not limited thereto.

The first adhesive layer 517 and second adhesive layer 519 can be configured between the first cover member 513 and the second cover member 515 to surround the vibration part 511. For example, one or more of the first adhesive layer 517 and second adhesive layer 519 can be configured to surround the vibration part 511, e.g., entirely or in most part as needed.

Any one of the first cover member 513 and the second cover member 515 can be connected or coupled to the vibration member 100 by the connection member 400 illustrated in FIGS. 2 to 12.

The vibration apparatus 500, the plurality of vibration generating apparatuses 500-1, 500-2, and 500-3, or a vibration generating part 510 according to an embodiment of the present disclosure can each further include a signal supply member 550.

The signal supply member 550 can be configured to supply the driving signal supplied from a driving circuit part to the vibration part 511. The signal supply member 550 can be configured to be electrically connected to the vibration part 511. The signal supply member 550 can be configured to be electrically connected to the first electrode layer 511*b* and the second electrode layer 511*c*.

A portion of the signal supply member 550 can be accommodated (or inserted) between the first cover member 513 and the second cover member 515. An end portion (or a distal end portion or one side or one portion) of the signal supply member 550 can be disposed or inserted (or accommodated) between one edge portion (or one periphery portion) of the first cover member 513 and one edge portion (or one periphery portion) of the second cover member 515. The one edge portion of the first cover member 513 and the one edge portion of the second cover member 515 can accommodate or vertically (or up and down) cover the end portion (or the distal end portion or the one side or one portion) of the signal supply member 550. Accordingly, the signal supply member 550 can be configured (or integrated) as one body with the vibration generating part 510. For example, the signal supply member 550 can be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 550 according to an embodiment of the present disclosure can include a base member 551 and a plurality of signal lines 553*a* and 553*b*. For example, the signal supply member 550 can include a base member 551, a first signal line 553*a*, and a second signal line 553*b*.

The base member 551 can include a transparent or opaque plastic material, but embodiments of the present disclosure are not limited thereto. The base member 551 can have a certain width along a first direction X and can be extended long along a second direction Y intersecting with the first direction X.

The first and second signal lines 553*a* and 553*b* can be disposed at the first surface of the base member 551 in parallel with the second direction Y, and can be spaced apart from each other or electrically separated from each other along the first direction X. The first and second signal lines 553*a* and 553*b* can be disposed in parallel to each other at the first surface of the base member 551. For example, the first and second signal lines 553*a* and 553*b* can be implemented in a line shape by patterning of a metal layer (or a conductive layer) formed or deposited at the first surface of the base member 551.

End portions (or distal end portions or one sides or one portions) of the first and second signal lines 553*a* and 553*b* can be separated from each other, and thus, can be individually curved or bent.

The end portion (or the distal end portion or the one side or one portion) of the first signal line 553*a* can be electrically connected to the first electrode layer 511*b* of the vibration part 511. For example, the end portion of the first signal line 553*a* can be electrically connected to at least a portion of the first electrode layer 511*b* of the vibration part 511 at or near one edge portion of the first cover member 513. For example, the end portion (or the distal end portion or the one side or one portion) of the first signal line 553*a* can be electrically and directly connected to at least a portion of the first electrode layer 511*b* of the vibration part 511. For example, the end portion (or the distal end portion or the one side or one portion) of the first signal line 553*a* can be electrically connected to or directly contact the first electrode layer 511*b* of the vibration part 511. For example, the end portion of the first signal line 553*a* can be electrically connected to the first electrode layer 511*b* by a conductive double-sided tape. Accordingly, the first signal line 553*a* can be configured to transfer a first driving signal, supplied from a vibration driver, to the first electrode layer 511*b* of the vibration part 511.

The end portion (or the distal end portion or the one side or one portion) of the second signal line 553*b* can be electrically connected to the second electrode layer 511*c* of the vibration part 511. For example, the end portion of the second signal line 553*b* can be electrically connected to at least a portion of the second electrode layer 511*c* of the vibration part 511 at one edge portion of the second cover member 515. For example, the end portion of the second signal line 553*b* can be electrically and directly connected to at least a portion of the second electrode layer 511*c* of the vibration part 511. For example, the end portion of the second signal line 553*b* can be electrically connected to or directly contact the second electrode layer 511*c* of the vibration part 511. For example, the end portion of the second signal line 553*b* can be electrically connected to the second electrode layer 511*c* by a conductive double-sided tape. Accordingly, the second signal line 553*b* can be configured to transfer a second driving signal, suppled from the vibration driver, to the second electrode layer 511*c* of the vibration part 511.

The signal supply member 550 according to an embodiment of the present disclosure can further include an insulation layer 555.

The insulation layer 555 can be disposed at the first surface of the base member 551 to cover each of the first signal line 553*a* and the second signal line 553*b* other than the end portion (or one side or one portion) of the signal supply member 550.

An end portion (or one side or one portion) of the signal supply member 550 including an end portion (or one side or one portion) of the base member 551 and an end portion (or one side or one portion) 555*a* of the insulation layer 555 can be inserted (or accommodated) between the first cover member 513 and the second cover member 515 and can be fixed between the first cover member 513 and the second cover member 515 by the first adhesive layer 517 and the second adhesive layer 519. Accordingly, the end portion (or one side or one portion) of the first signal line 553*a* can be maintained with being electrically connected to the first electrode layer 511*b* of the vibration part 511, and the end portion (or one side or one portion) of the second signal line 553*b* can be maintained with being electrically connected to the second electrode layer 511*c* of the vibration part 511. Further, the end portion (or one side or one portion) of the signal supply member 550 can be inserted (or accommodated) and fixed between the vibration part 511 and the first cover member 513, and thus, a contact defect between the vibration generating part 510 and the signal supply member 550 caused by the movement of the signal supply member 550 can be prevented.

In the signal supply member 550 according to an embodiment of the present disclosure, each of the end portion (or one side or one portion) of the base member 551 and the end portion (or one side or one portion) 555*a* of the insulation layer 555 illustrated by a dotted line in FIG. 15 can be removed. For example, each of the end portion of the first signal line 553*a* and the end portion of the second signal line 553*b* can be exposed at the outside (e.g., next to the end of the vibration part 511) without being supported or covered by each of the end portion (or one side) of the base member 551 and the end portion (or one side or one portion) 555*a* of the insulation layer 555, respectively. For example, the end portion of each of the first and second signal lines 553*a* and 553*b* can protrude (or extend) to have a certain length from an end 55*le* of the base member 551 or an end 555*e* of the insulation layer 555. Accordingly, each of the end portion (or the distal end portion or the one side or one portion) of each of the first and second signal lines 553*a* and 553*b* can be individually or independently curved (or bent), independently of the base member 551 and the insulation layer 555.

The end portion (or one side or one portion) of the first signal line 553*a*, which is not supported by the end portion (or one side or one portion) of the base member 551 and the end portion 555*a* of the insulation layer 555, can be directly connected to or directly contact the first electrode layer 511*b* of the vibration part 511. The end portion (or one side or one portion) of the second signal line 553*b*, which is not supported by the end portion (or one side or one portion) of the base member 551 and the end portion 555*a* of the insulation layer 555, can be directly connected to or directly contact the second electrode layer 511*c* of the vibration part 511. For instance, in the same or similar manner as the configuration as shown in FIG. 15 for the first signal line 553*a*, the insulating layer 555 and the base member 551 for the second signal line 553*b* can be disposed, e.g., with the second signal line 553*b* being exposed to directly contact the second electrode layer 511*c*.

According to an embodiment of the present disclosure, a portion of the signal supply member 550 or a portion of the base member 551 can be disposed or inserted (or accommodated) between the first cover member 513 and the second cover member 515, and thus, the signal supply member 550 can be configured (or integrated) as one body with the vibration generating part 510. Accordingly, the vibration generating part 510 and the signal supply member 550 can be configured as one part (or an element or a one component), and thus, an effect of uni-materialization can be obtained. For instance, a single component can be obtained which can then be easily and efficiently installed in the apparatus according to embodiments of the present disclosure.

According to an embodiment of the present disclosure, the first signal line 553*a* and the second signal line 553*b* of the signal supply member 550 can be configured (or integrated) as one body with the vibration generating part 510, and thus, a soldering process for an electrical connection between the vibration generating part 510 and the signal supply member 550 can not be needed. Accordingly, a manufacturing process and a structure of the vibration apparatus 500 or each of the plurality of vibration generating apparatuses 500-1, 500-2, and 500-3 can be simplified, and thus, the expense, time and hazards associated with a soldering process are avoided.

Figure 16:
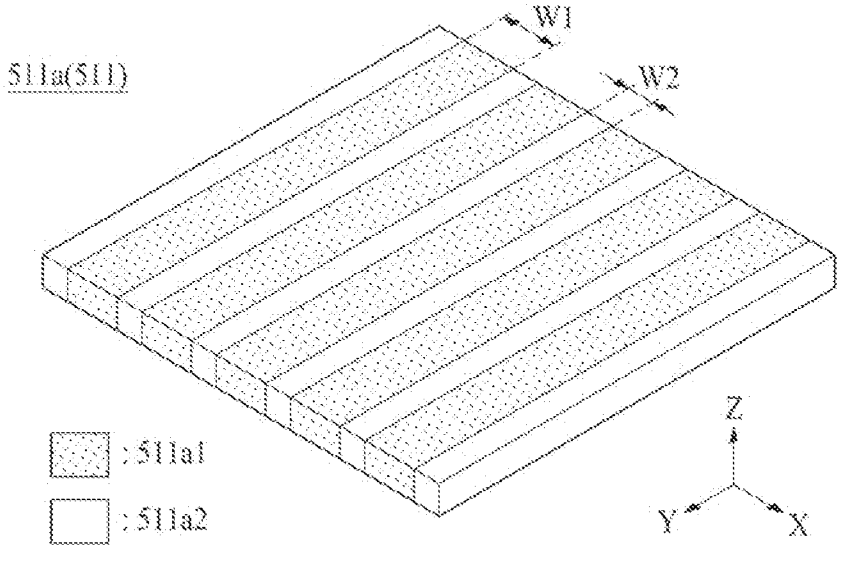
FIG. 16 illustrates a vibration layer according to another embodiment of the present disclosure.

FIG. 16 illustrates a vibration layer according to another embodiment of the present disclosure. Particularly, FIG. 16 illustrates another example of the vibration layer (e.g., 511*a*) described above with reference to FIGS. 13 to 15.

With reference to FIGS. 14 and 16, the vibration layer 511*a* according to another embodiment of the present disclosure can include a plurality of first portions 511*a*1 and a plurality of second portions 511*a*2. For example, the plurality of first portions 511*a*1 and the plurality of second portions 511*a*2 can be alternately and repeatedly disposed along a first direction X (e.g., X-direction) or a second direction Y (e.g., Y-direction).

Each of the plurality of first portions 511*a*1 can include an inorganic material portion having a piezoelectric effect (or a piezoelectric characteristic). For example, each of the plurality of first portions 511*a*1 can include at least one or more of a piezoelectric inorganic material and a piezoelectric organic material. For example, each of the plurality of first portions 511*a*1 can be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 511*a*1 can have a first width W1 parallel to the first direction X (or the second direction Y) and can be extended along the second direction Y (or the first direction X). Each of the plurality of first portions 511*a*1 can include a material which is substantially the same as a vibration layer 511*a* described above with reference to FIGS. 13 to 15, and thus, repeated descriptions thereof are omitted or may be briefly discussed.

Each of the plurality of second portions 511*a*2 can be disposed between the plurality of first portions 511*al*. For example, each of the plurality of first portions 511*a*1 can be disposed between two adjacent second portions 511*a*2 of the plurality of second portions 511*a*2. Each of the plurality of second portions 511*a*2 can have a second width W2 parallel to the first direction X (or the second direction Y) and can be extended along the second direction Y (or the first direction X). The first width W1 can be the same as or different from the second width W2. For example, the first width W1 can be greater than the second width W2. For example, the first portion 511*a*1 and the second portion 511*a*2 can include a line shape or a stripe shape which has the same size or different sizes. For example, the first portion 511*a*1 and the second portion 511*a*2 may be shaped as a line or as stripes with either equal-sized or different-sized stripes.

Each of the plurality of second portions 511*a*2 can be configured to fill a gap between two adjacent first portions of the plurality of first portions 511*al*. Each of the plurality of second portions 511*a*2 can be configured to fill a gap between two adjacent first portions of the plurality of first portions 511*al*, and thus, can be connected to or attached on lateral surfaces of the first portion 511*a*1 adjacent thereto. In this manner, the first and second portions 511*a*1 and 511*a*2 can be alternatingly disposed in strips. According to an embodiment of the present disclosure, each of the plurality of first portions 511*a*1 and the plurality of second portions 511*a*2 can be disposed (or arranged) at the same plane (or the same layer) in parallel with each other. Therefore, the vibration layer 511*a* can be expanded to a desired size or length by a lateral coupling (or connection) of first portions 511*a*1 and second portions 511*a*2.

According to an embodiment of the present disclosure, each of the plurality of second portions 511*a*2 can absorb an impact applied to the first portions 511*al*, and thus, can enhance the total durability of the first portions 511*a*1 and provide flexibility to the vibration layer 511*a*. Each of the plurality of second portions 511*a*2 can include an organic material having a ductile (e.g., soft and/or elastic) characteristic. For example, each of the plurality of second portions 511*a*2 can include one or more of an epoxy-based polymer, an acrylic-based polymer, and a silicone-based polymer, but embodiments of the present disclosure are not limited thereto. For example, each of the plurality of second portions 511*a*2 can be an organic portion, an organic material portion, an adhesive portion, a stretch portion, a bending portion, a damping portion, or a ductile (e.g., soft and/or elastic) portion, but embodiments of the present disclosure are not limited thereto.

A first surface of each of the plurality of first portions 511*a*1 and the plurality of second portions 511*a*2 can be connected to the first electrode layer 511*b* in common. A second surface of each of the plurality of first portions 511*a*1 and the plurality of second portions 511*a*2 can be connected to the second electrode layer 511*c* in common.

The plurality of first portions 511*a*1 and the plurality of second portion 511*a*2 can be disposed on (or connected to) the same plane, and thus, the vibration layer 511*a* according to another embodiment of the present disclosure can have a single thin film-type. Accordingly, the vibration part 511 or the vibration generating part 510 including the vibration layer 511*a* according to another embodiment of the present disclosure can vibrate by the first portion 511*a*1 having a vibration characteristic and can be bent in a curved shape by the second portion 511$a$2 having flexibility.

Figure 17:
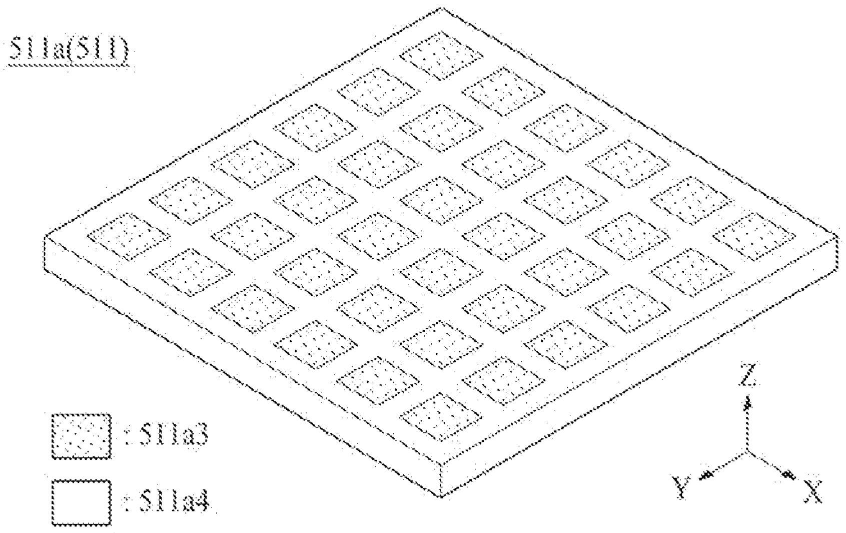
FIG. 17 illustrates a vibration layer according to another embodiment of the present disclosure.

FIG. 17 illustrates a vibration layer according to another embodiment of the present disclosure. Particularly, FIG. 17 illustrates another example of the vibration layer (e.g., 511$a$) described above with reference to FIGS. 13 to 16.

With reference to FIGS. 14 and 17, the vibration layer 511$a$ according to another embodiment of the present disclosure can include a plurality of first portions 511$a$3 and a second portion 511$a$4 disposed between the plurality of first portions 511$a$3.

Each of the plurality of first portions 511$a$3 can be disposed to be spaced apart from one another along each of the first direction X and the second direction Y. For example, each of the plurality of first portions 511$a$3 can have a hexahedral shape having the same size (e.g., a cube shape) and can be disposed in a lattice shape, but embodiments of the present disclosure are not limited thereto. In an example, from the top view, each first portion 511$a$3 would have a square shape. For example, each of the plurality of first portions 511$a$3 can have a circular shape plate, an oval shape plate, or a polygonal shape plate, which has the same size as each other, but embodiments of the present disclosure are not limited thereto.

Each of the plurality of first portions 511$a$3 can include a material which is be substantially the same as the first portion 511$a$1 described above with reference to FIG. 16, and thus, repeated descriptions thereof are omitted or may be briefly discussed.

The second portion 511$a$4 can be disposed between the plurality of first portions 511$a$3 along each of the first direction X and the second direction Y. The second portion 511$a$4 can be configured to fill a gap between two adjacent first portions 511$a$3 or to surround each of the plurality of first portions 511$a$3, and thus, the second portion 511$a$4 can be connected to or attached on the first portion 511$a$3 adjacent thereto. For instance, the first portions 511$a$3 are arranged in rows and columns and the second portion 511$a$4 surround all of such first portions 511$a$3 as shown in FIG. 17, and such a configuration can be referred to herein as a lattice configuration. The second portion 511$a$4 can include a material which is be substantially the same as the second portion 511$a$2 described above with reference to FIG. 16, and thus, repeated descriptions thereof are omitted or may be briefly discussed.

A first surface of each of the plurality of first portions 511$a$3 and the second portions 511$a$4 can be connected to the first electrode layer 511$b$ in common. A second surface of each of the plurality of first portions 511$a$3 and the second portions 511$a$4 can be connected to the second electrode layer 511$c$ in common.

The plurality of first portions 511$a$3 and the second portion 511$a$4 can be disposed on (or connected to) the same plane, and thus, the vibration layer 511$a$ according to another embodiment of the present disclosure can have a single thin film-type. Accordingly, the vibration part 511 or the vibration generating part 510 including the vibration layer 511$a$ according to another embodiment of the present disclosure can vibrate by the first portion 511$a$3 having a vibration characteristic and can be bent in a curved shape by the second portion 511$a$4 having flexibility.

Figure 18:
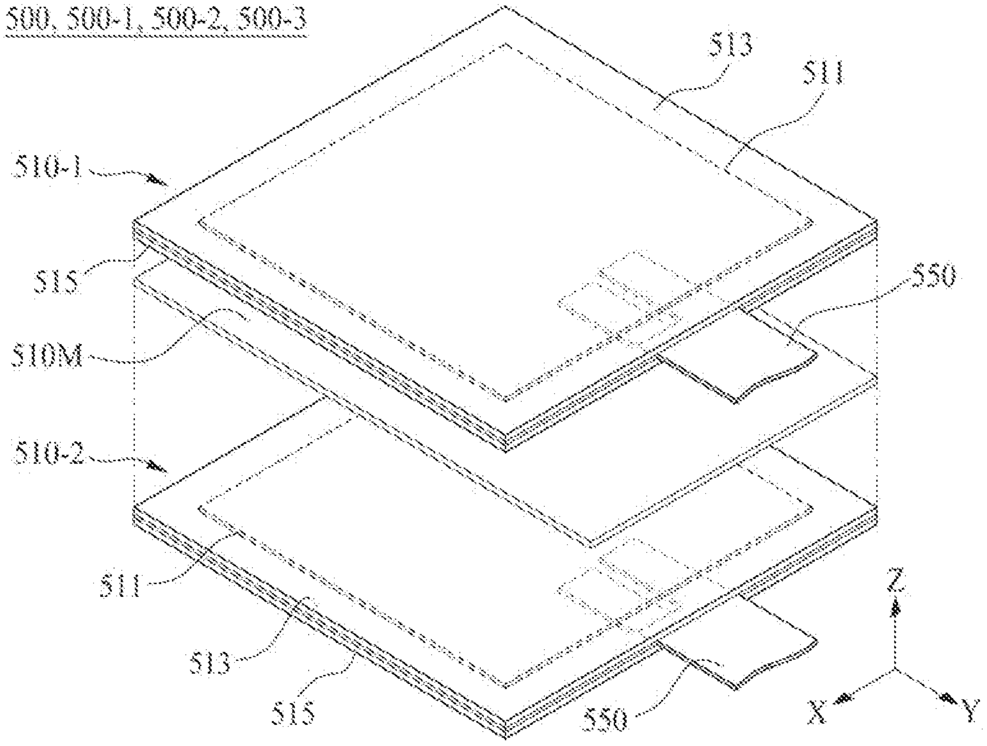
FIG. 18 illustrates a vibration apparatus according to another embodiment of the present disclosure.

FIG. 18 illustrates a vibration apparatus according to another embodiment of the present disclosure. Particularly, FIG. 18 illustrates another example of the vibration apparatus or the plurality of vibration generating apparatuses described above with reference to FIGS. 1 to 12.

With reference to FIGS. 2 and 18, the vibration apparatus 500 or each of the plurality of vibration generating apparatuses 500-1, 500-2, and 500-3 according to another embodiment of the present disclosure can include two or more vibration generating parts 510-1 and 510-2. For example, the vibration apparatus 500 or each of the plurality of vibration generating apparatuses 500-1, 500-2, and 500-3 can include a first vibration generating part 510-1 and a second vibration generating part 510-2.

The first vibration generating part 510-1 and the second vibration generating part 510-2 can overlap or be stacked with each other to be displaced (or driven or vibrated) in the same direction to maximize an amplitude displacement of the vibration apparatus 500 or an amplitude displacement of the plurality of vibration generating apparatuses 500-1, 500-2, and 500-3. For example, the first vibration generating part 510-1 and the second vibration generating part 510-2 can have substantially the same size, but embodiments of the present disclosure are not limited thereto. For example, the first vibration generating part 510-1 and the second vibration generating part 510-2 can have substantially the same size within an error range of a manufacturing process, but embodiments of the present disclosure are not limited thereto. Therefore, the first vibration generating part 510-1 and the second vibration generating part 510-2 can maximize an amplitude displacement of the vibration apparatus 500 and/or an amplitude displacement of the plurality of vibration generating apparatuses 500-1, 500-2, and 500-3.

According to an embodiment of the present disclosure, any one of the first vibration generating part 510-1 and the second vibration generating part 510-2 can be connected or coupled to a vibration member 100 by a connection member 400 illustrated in FIGS. 2 to 12. For example, the first vibration generating part 510-1 can be connected or coupled to the vibration member 100 by the connection member 400.

Each of the first vibration generating part 510-1 and the second vibration generating part 510-2 can be the same as or substantially the same as the vibration generating part 510 described above with reference to FIGS. 13 to 17, and thus, like reference numeral refer to like element and repeated descriptions thereof are omitted or may be briefly discussed.

The vibration apparatus 500 or the plurality of vibration generating apparatuses 500-1, 500-2, and 500-3 according to another embodiment of the present disclosure can further include an intermediate adhesive member 510M.

The intermediate adhesive member 510M can be disposed or connected between the first vibration generating part 510-1 and the second vibration generating part 510-2. For example, the intermediate adhesive member 510M can be disposed or connected between the second cover member 515 of the first vibration generating part 510-1 and the first cover member 513 of the second vibration generating part 510-2. For example, the intermediate adhesive member 510M can be an adhesive member or a connection member, but embodiments of the present disclosure are not limited thereto.

The intermediate adhesive member 510M according to an embodiment of the present disclosure can be configured in a material including an adhesive layer which is good in adhesive force or attaching force with respect to each of the first vibration generating part 510-1 and the second vibration generating part 510-2. For example, the intermediate adhesive member 510M can include a foam pad, a double-sided tape, a double-sided foam tape, a double-sided foam pad, a double-sided adhesive tape, an adhesive, or the like, but embodiments of the present disclosure are not limited thereto. For example, an adhesive layer of the intermediate adhesive member 510M can include epoxy resin, acrylic resin, silicone resin, or urethane resin, but embodiments of the present disclosure are not limited thereto. The adhesive layer of the intermediate adhesive member 510M can include a urethane-based material (or substance) having relatively ductile (e.g., soft and/or elastic) characteristic. The adhesive layer minimizes or reduces the vibration loss which can be caused by displacement interference between the first vibration generating part 510-1 and the second vibration generating part 510-2. In other words, the adhesive layer couples the first vibration generating part 510-1 and the second vibration generating part 510-2 to increase vibration. In addition, the adhesive layer allows each of the first vibration generating part 510-1 and the second vibration generating part 510-2 to be freely and independently displaced (or driven or vibrated).

The vibration apparatus 500 or the plurality of vibration generating apparatuses 500-1, 500-2, and 500-3 according to another embodiment of the present disclosure can include the first vibration generating part 510-1 and the second vibration generating part 510-2 which are stacked (or overlap or piled) to vibrate (or displace or drive) in the same direction, and thus, the amount of displacement or an amplitude displacement can be maximized or increase. Accordingly, the amount of displacement (or a bending force or a driving force) or an amplitude of displacement of the vibration member can be maximized or increased.

Figure 19:
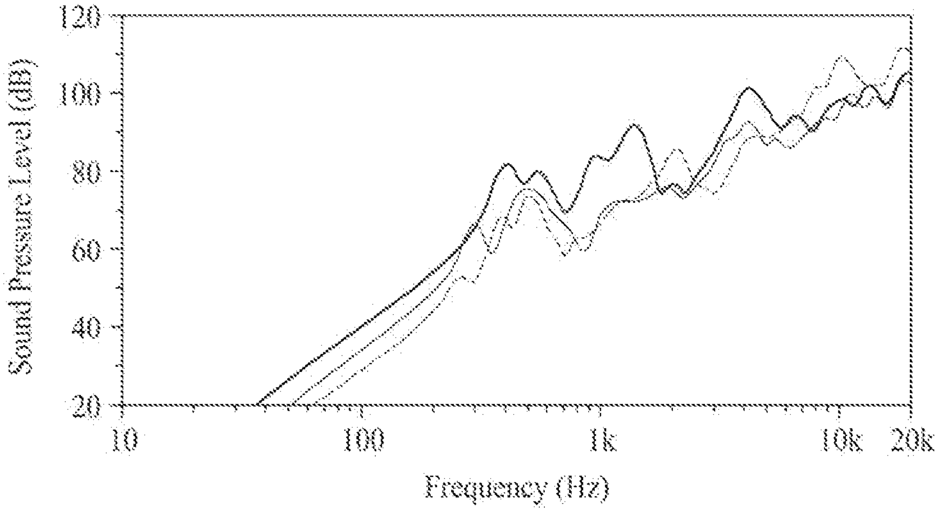
FIG. 19 illustrates a sound output characteristic of an apparatus according to an embodiment of the present disclosure and an apparatus according to an experimental example.

FIG. 19 illustrates an example of a sound output characteristic of an apparatus according to an embodiment of the present disclosure and an apparatus according to an experimental example.

In FIG. 19, the abscissa axis represents a frequency (hertz, Hz), and the ordinate axis represents a sound pressure level (SPL) (decibel, dB). Further, in FIG. 19, a dotted line represents a sound output characteristic of the apparatus according to the experimental example including a vibration member having a single-layered structure including a plastic material, a solid line represents a sound output characteristic of an apparatus including a vibration member according to the first embodiment of the present disclosure described above with reference to FIGS. 2 and 3, and a thick solid line represents a sound output characteristic of an apparatus including a vibration member according to the fourth embodiment of the present disclosure described above with reference to FIGS. 2 and 6. An apparatus including a vibration member according to the third embodiment of the present disclosure described above with reference to FIGS. 2 and 5 can have a sound output characteristic which is the same as or similar to the fourth embodiment of the present disclosure.

As seen in FIG. 19, comparing with the dotted line, in each of the solid line and the thick solid line, it can be seen that a flatness characteristic of a sound pressure level is enhanced.

Comparing with the dotted line, in the solid line, it is seen that the sound pressure level increases in a sound band of approximately 1 kHz or less and a peak phenomenon and a dip phenomenon decrease across the whole spectrum and, particularly, in a sound band of approximately 2 kHz or less and in a sound band of approximately 1 kHz or less. Accordingly, in the apparatus including the vibration member according to the first embodiment of the present disclosure, a sound characteristic and/or a sound pressure level characteristic of a low-pitched sound band can be enhanced, and a flatness characteristic of a sound pressure level can be enhanced.

Comparing with the dotted line, in the thick solid line, it is seen that the sound pressure level increases in a sound band of approximately 2 kHz or less and an undesired sound pressure level decreases in a high-pitched sound band of approximately 2 kHz or more and particularly, in the sound band of approximately 7 kHz or more. Thus, it can be seen that a balance characteristic of a sound pressure level or a flatness characteristic of a sound pressure level is enhanced in a full-pitched sound band. Accordingly, in the apparatus including the vibration member according to the fourth embodiment of the present disclosure, a sound characteristic and/or a sound pressure level characteristic of a middle-low-pitched sound band of 2 kHz or less can be enhanced, and a balance characteristic or a flatness characteristic of a sound pressure level in a full-pitched sound band can be enhanced.

An apparatus according to one or more embodiments of the present disclosure can comprise a vibration member, and a vibration apparatus configured to vibrate the vibration member. The vibration member can comprise a plurality of plates overlapping one another and including different materials.

According to one or more embodiments of the present disclosure, the plurality of plates can have different stiffness or different modulus. For example, the plurality of plates can have different stiffnesses and/or different Young's moduli and/or different thicknesses.

According to one or more embodiments of the present disclosure, the vibration member can comprise a first plate and a second plate, the first plate and the second plate being vertically stacked.

According to one or more embodiments of the present disclosure, the first plate and the second plate can have different thicknesses, or a thickness of the first plate can be smaller than a thickness of the second plate.

According to one or more embodiments of the present disclosure, the vibration member can comprise a first plate and a second plate, the first plate and the second plate being vertically stacked. One of the first plate and the second plate can be connected to the vibration apparatus.

According to one or more embodiments of the present disclosure, the first plate can be connected to the vibration apparatus and has a stiffness or a modulus which is higher than stiffness or a modulus of the second plate.

According to one or more embodiments of the present disclosure, the vibration member can further comprise at least one or more holes configured at the first plate. The at least one or more holes can be between the vibration apparatus and the second plate and/or located in a region of the first plate facing the vibration apparatus.

According to one or more embodiments of the present disclosure, the second plate can be connected to the vibration apparatus and has stiffness or a modulus which is lower than stiffness or a modulus of the first plate.

According to one or more embodiments of the present disclosure, the vibration member can comprise a plurality of first plates spaced apart from one another, and a second plate connected to each of the plurality of first plates. The vibration apparatus can comprise a plurality of vibration generating apparatuses connected to the plurality of first plates.

According to one or more embodiments of the present disclosure, the vibration member can further comprise one or more holes configured at each of the plurality of first plates. The one or more holes can be between the vibration apparatus and the second plate.

According to one or more embodiments of the present disclosure, the vibration member can comprise a plurality of second plates spaced apart from one another, and a first plate connected to each of the plurality of second plates. The vibration apparatus can comprise a plurality of vibration generating apparatuses connected to the plurality of second plates.

According to one or more embodiments of the present disclosure, the first plate can have a modulus of 50 Gpa (gigapascal) or more, and/or the second plate can have a modulus of 10 Gpa or less.

According to one or more embodiments of the present disclosure, the first plate can include at least one of a metal material, fiber reinforced plastic, carbon, and glass.

According to one or more embodiments of the present disclosure, the second plate can include at least one of a plastic material, a styrene material, and a micro cellular plastic material.

According to one or more embodiments of the present disclosure, the vibration member can further comprise an adhesive member between the first plate and the second plate.

According to one or more embodiments of the present disclosure, the first plate and the second plate can be configured as one plate which is attached to each other by a deposition process or a bonding process.

According to one or more embodiments of the present disclosure, a thickness of the first plate can be smaller than a thickness of the second plate.

According to one or more embodiments of the present disclosure, the vibration apparatus can comprise a first cover member, a second cover member, and a vibration part between the first cover member and the second cover member, the vibration part including a piezoelectric material.

According to one or more embodiments of the present disclosure, the vibration apparatus can further comprise a signal supply member electrically connected to the vibration part. A portion of the signal supply member can be accommodated between the first cover member and the second cover member.

According to one or more embodiments of the present disclosure, the vibration apparatus can comprise a first vibration generating part, a second vibration generating part stacked on the first vibration generating part, and an intermediate adhesive member between the first vibration generating part and the second vibration generating part. One of the first vibration generating part and the second vibration generating part can be connected to the vibration member.

According to one or more embodiments of the present disclosure, each of the first vibration generating part and the second vibration generating part can comprise a first cover member, a second cover member, and a vibration part between the first cover member and the second cover member, the vibration part including a piezoelectric material.

According to one or more embodiments of the present disclosure, an apparatus can include at least one vibration apparatus configured to generate vibrations; a vibration member connected to the vibration apparatus, and including a plurality of stacked plates configured to receive the vibrations from the vibration apparatus; a connection member disposed between the vibration apparatus and the vibration member; and a supporting member configured to accommodate the connection member and the vibration apparatus.

According to one or more embodiments of the present disclosure, one of the plurality of stacked plates can include one or more holes disposed on the connection member which is disposed on the vibration apparatus.

According to one or more embodiments of the present disclosure, the vibration apparatus can include a vibration part composed of a first electrode layer, a second electrode layer, and a vibration layer disposed between the first and second electrode layers, and the vibration layer of the vibration part can have first and second portions that are in strips, or in a lattice configuration.

According to one or more embodiments of the present disclosure, each of the plurality of stacked plates can include protrusion parts disposed at an outer edge portion thereof.

An apparatus according to an embodiment of the present disclosure can be applied to or included in a vibration generating apparatus and/or a sound generating apparatus. The apparatus according to an embodiment of the present disclosure can be applied to or included in display devices, mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. Further, the vibration apparatus or the plurality of vibration generating apparatus according to one or more embodiments of the present disclosure can be applied to or included in an organic light-emitting lighting apparatus or an inorganic light-emitting lighting apparatus. When the vibration apparatus or the plurality of vibration generating apparatus is applied to or included in the lighting apparatuses, the lighting apparatuses can act as lighting and a speaker. In addition, when the vibration apparatus or the plurality of vibration generating apparatus according to one or more embodiments of the present disclosure is applied to or included in the mobile apparatuses, or the like, the vibration apparatus or the plurality of vibration generating apparatus can be one or more of a speaker, a receiver, and a haptic device, but embodiments of the present disclosure are not limited thereto.

It will be apparent to those skilled in the art that various modifications and variations can be made in the present disclosure without departing from the scope of the disclosures. Thus, it is intended that the present disclosure covers the modifications and variations of this disclosure provided that within the scope of the claims and their equivalents.

What is claimed is:

1. An apparatus, comprising:

a vibration member; and a vibration apparatus configured to vibrate the vibration member, wherein the vibration member comprises a plurality of plates overlapping one another and including different materials, wherein the plurality of plates in the vibration member comprise a first plate and a second plate, the first plate and the second plate being vertically stacked, wherein the first plate includes one or more of a metal material, fiber reinforced plastic, carbon, and glass, wherein the second plate includes one or more of a plastic material, a styrene material, and a micro cellular plastic material, and wherein the first plate and the second plate are directly coupled to each other without a separate adhesive, and are integrated as one plate by fusion bonding.

2. The apparatus of claim 1, wherein the plurality of plates have different stiffnesses and/or different Young's moduli and/or different thicknesses.

3. The apparatus of claim 1, wherein the first plate and the second plate have different thicknesses, or wherein a thickness of the first plate is smaller than a thickness of the second plate.

4. The apparatus of claim 1, wherein at least one of the first plate and the second plate is connected to the vibration apparatus.

5. The apparatus of claim 1, wherein the first plate is connected to the vibration apparatus and has a stiffness or a modulus which is higher than a stiffness or a modulus of the second plate, or wherein the second plate is connected to the vibration apparatus and has stiffness or a modulus which is lower than stiffness or a modulus of the first plate.

6. The apparatus of claim 1, wherein the vibration member further comprises at least one or more holes disposed in the first plate, and wherein the at least one or more holes are disposed between the vibration apparatus and the second plate and/or located in a region of the first plate facing the vibration apparatus.

7. The apparatus of claim 1, wherein the plurality of plates in the vibration member comprise:

a plurality of first plates spaced apart from one another, wherein the second plate is connected to each of the plurality of first plates, and wherein the vibration apparatus comprises a plurality of vibration generating apparatuses connected to the plurality of first plates, respectively.

8. The apparatus of claim 7, wherein the vibration member further comprises one or more holes disposed in each of the plurality of first plates, and wherein the one or more holes are disposed between each of the plurality of vibration generating apparatuses and the second plate.

9. The apparatus of claim 1, wherein the plurality of plates in the vibration member comprise:

a plurality of second plates spaced apart from one another, wherein the first plate is connected to each of the plurality of second plates, and wherein the vibration apparatus comprises a plurality of vibration generating apparatuses connected respectively to the plurality of second plates.

10. The apparatus of claim 1, wherein the first plate has a modulus equal to or greater than 50 Gpa (gigapascal), and/or wherein the second plate has a modulus equal to or less than 10 Gpa.

11. The apparatus of claim 1, wherein the vibration apparatus comprises:

a first cover member;

a second cover member; and a vibration part between the first cover member and the second cover member, the vibration part including a piezoelectric material configured to generate vibrations to the vibration member.

12. The apparatus of claim 11, wherein the vibration apparatus further comprises a signal supply member electrically connected to the vibration part, and wherein a portion of the signal supply member is accommodated between the first cover member and the second cover member.

13. The apparatus of claim 1, wherein the vibration apparatus comprises:

a first vibration generating part;

a second vibration generating part stacked on the first vibration generating part; and an intermediate adhesive member between the first vibration generating part and the second vibration generating part, and wherein one of the first vibration generating part and the second vibration generating part is connected to the vibration member.

14. The apparatus of claim 13, wherein each of the first vibration generating part and the second vibration generating part comprises:

a first cover member;

a second cover member; and a vibration part between the first cover member and the second cover member, the vibration part including a piezoelectric material configured to generate vibrations to the vibration member.

15. An apparatus, comprising:

at least one vibration apparatus configured to generate vibrations;

a vibration member connected to the at least one vibration apparatus, and including a plurality of stacked plates configured to receive the vibrations from the at least one vibration apparatus;

a connection member disposed between the at least one vibration apparatus and the vibration member; and a supporting member configured to accommodate the connection member and the at least one vibration apparatus, wherein the plurality of stacked plates in the vibration member comprise a first plate and a second plate, the first plate and the second plate being vertically stacked, wherein the first plate includes one or more of a metal material, fiber reinforced plastic, carbon, and glass, wherein the second plate includes one or more of a plastic material, a styrene material, and a micro cellular plastic material, and wherein the first plate and the second plate are directly coupled to each other without a separate adhesive, and are integrated as one plate by fusion bonding.

16. The apparatus of claim 15, wherein one of the plurality of stacked plates includes one or more holes disposed on the connection member which is disposed on the at least one vibration apparatus.

17. The apparatus of claim 15, wherein the at least one vibration apparatus includes a vibration part composed of a first electrode layer, a second electrode layer, and a vibration layer disposed between the first and second electrode layers, and wherein the vibration layer of the vibration part has first and second portions that are in strips, or in a lattice configuration.

18. The apparatus of claim 15, wherein one stacked plate of the plurality of stacked plates includes protrusion parts disposed at an outer edge portion thereof.

* * * * *